US012302259B2

(12) United States Patent
Liu et al.

(10) Patent No.: US 12,302,259 B2
(45) Date of Patent: May 13, 2025

(54) EMISSION CONTROL OF AN AERIAL USER EQUIPMENT

(71) Applicant: QUALCOMM Incorporated, San Diego, CA (US)

(72) Inventors: Le Liu, San Jose, CA (US); Alberto Rico Alvarino, San Diego, CA (US); Chiranjib Saha, San Diego, CA (US); Changhwan Park, San Diego, CA (US); Xiao Feng Wang, San Diego, CA (US); Peter Gaal, San Diego, CA (US); Umesh Phuyal, San Diego, CA (US); Ebraam Adel Khalifa, Nuremberg (DE); Kazuki Takeda, Tokyo (JP); Marco Papaleo, Bologna (IT); Stefano Faccin, San Ysidro, CA (US); Juan Montojo, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 408 days.

(21) Appl. No.: 17/660,117

(22) Filed: Apr. 21, 2022

(65) Prior Publication Data

US 2023/0345385 A1    Oct. 26, 2023

(51) Int. Cl.
*H04W 52/36* (2009.01)
*H04W 4/021* (2018.01)
*H04W 52/28* (2009.01)
*H04W 84/06* (2009.01)

(52) U.S. Cl.
CPC ......... *H04W 52/367* (2013.01); *H04W 4/021* (2013.01); *H04W 52/285* (2013.01); *H04W 84/06* (2013.01)

(58) Field of Classification Search
CPC . H04W 52/367; H04W 4/021; H04W 52/285; H04W 84/06; H04B 7/18506
See application file for complete search history.

(56) References Cited

U.S. PATENT DOCUMENTS

| | | | |
|---|---|---|---|
| 2016/0330676 A1* | 11/2016 | Thangarasa | H04W 48/20 |
| 2019/0212724 A1* | 7/2019 | Phuyal | H04W 84/042 |
| 2020/0033849 A1* | 1/2020 | Yiu | G05D 1/0022 |
| 2021/0051595 A1 | 2/2021 | Rico Alvarino et al. | |
| 2021/0144652 A1 | 5/2021 | Gheorghiu et al. | |

(Continued)

FOREIGN PATENT DOCUMENTS

WO    WO-2021233548 A1    11/2021

OTHER PUBLICATIONS

International Search Report and Written Opinion—PCT/US2023/063941—ISA/EPO—Jun. 5, 2023.

*Primary Examiner* — Abdullahi E Salad
(74) *Attorney, Agent, or Firm* — Harrity & Harrity, LLP

(57) ABSTRACT

Various aspects of the present disclosure generally relate to wireless communication. In some aspects, a user equipment (UE) may obtain emission control information that indicates a first emission control configuration associated with a first operating configuration and a second emission control configuration associated with a second operating configuration. The UE may transmit, using the first emission control configuration or the second emission control configuration based at least in part on a UE operating configuration associated with the UE, a communication. Numerous other aspects are described.

27 Claims, 9 Drawing Sheets

(56) References Cited

U.S. PATENT DOCUMENTS

2022/0287114 A1* 9/2022 Liu ..................... H04L 1/1819
2023/0239724 A1   7/2023 Pateromichelakis et al.
2024/0187900 A1* 6/2024 Phuyal ................. H04W 24/08

* cited by examiner

EMISSION CONTROL OF AN AERIAL USER EQUIPMENT

FIELD OF THE DISCLOSURE

Aspects of the present disclosure generally relate to wireless communication and to techniques and apparatuses for emission control of an aerial user equipment.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, or the like). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless network may include one or more base stations that support communication for a user equipment (UE) or multiple UEs. A UE may communicate with a base station (BS) via downlink communications and uplink communications. "Downlink" (or "DL") refers to a communication link from the base station to the UE, and "uplink" (or "UL") refers to a communication link from the UE to the base station.

The above multiple access technologies have been adopted in various telecommunication standards to provide a common protocol that enables different UEs to communicate on a municipal, national, regional, and/or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM and/or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include obtaining emission control information that indicates a first emission control configuration associated with a first operating configuration and a second emission control configuration associated with a second operating configuration. The method may include transmitting, using the first emission control configuration or the second emission control configuration based at least in part on a UE operating configuration associated with the UE, a communication.

Some aspects described herein relate to a method of wireless communication performed by a network entity. The method may include receiving UE capability information associated with an aerial UE. The method may include transmitting emission control information that indicates a first emission control configuration associated with a first operating configuration and a second emission control configuration associated with a second operating configuration, the emission control information being based at least in part on the UE capability information.

Some aspects described herein relate to an apparatus for wireless communication at a UE. The apparatus may include a memory and one or more processors coupled to the memory. The one or more processors may be configured to obtain emission control information that indicates a first emission control configuration associated with a first operating configuration and a second emission control configuration associated with a second operating configuration. The one or more processors may be configured to transmit, using the first emission control configuration or the second emission control configuration based at least in part on a UE operating configuration associated with the UE, a communication.

Some aspects described herein relate to an apparatus for wireless communication at a network entity. The apparatus may include a memory and one or more processors coupled to the memory. The one or more processors may be configured to receive UE capability information associated with an aerial UE. The one or more processors may be configured to transmit emission control information that indicates a first emission control configuration associated with a first operating configuration and a second emission control configuration associated with a second operating configuration, the emission control information being based at least in part on the UE capability information.

Some aspects described herein relate to a non-transitory computer-readable medium that stores a set of instructions for wireless communication by a UE. The set of instructions, when executed by one or more processors of the UE, may cause the UE to obtain emission control information that indicates a first emission control configuration associated with a first operating configuration and a second emission control configuration associated with a second operating configuration. The set of instructions, when executed by one or more processors of the UE, may cause the UE to transmit, using the first emission control configuration or the second emission control configuration based at least in part on a UE operating configuration associated with the UE, a communication.

Some aspects described herein relate to a non-transitory computer-readable medium that stores a set of instructions for wireless communication by a network entity. The set of instructions, when executed by one or more processors of the network entity, may cause the network entity to receive UE capability information associated with an aerial UE. The set of instructions, when executed by one or more processors of the network entity, may cause the network entity to transmit emission control information that indicates a first emission control configuration associated with a first operating configuration and a second emission control configuration associated with a second operating configuration, the emission control information being based at least in part on the UE capability information.

Some aspects described herein relate to an apparatus for wireless communication. The apparatus may include means for obtaining emission control information that indicates a first emission control configuration associated with a first operating configuration and a second emission control configuration associated with a second operating configuration. The apparatus may include means for transmitting, using the first emission control configuration or the second emission control configuration based at least in part on a UE operating configuration associated with the UE, a communication.

Some aspects described herein relate to an apparatus for wireless communication. The apparatus may include means for receiving UE capability information associated with an aerial UE. The apparatus may include means for transmitting emission control information that indicates a first emission control configuration associated with a first operating configuration and a second emission control configuration associated with a second operating configuration, the emission control information being based at least in part on the UE capability information.

Aspects generally include a method, apparatus, system, computer program product, non-transitory computer-readable medium, user equipment, base station, wireless communication device, and/or processing system as substantially described herein with reference to and as illustrated by the drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages, will be better understood from the following description when considered in connection with the accompanying figures. Each of the figures is provided for the purposes of illustration and description, and not as a definition of the limits of the claims.

While aspects are described in the present disclosure by illustration to some examples, those skilled in the art will understand that such aspects may be implemented in many different arrangements and scenarios. Techniques described herein may be implemented using different platform types, devices, systems, shapes, sizes, and/or packaging arrangements. For example, some aspects may be implemented via integrated chip embodiments or other non-module-component based devices (e.g., end-user devices, vehicles, communication devices, computing devices, industrial equipment, retail/purchasing devices, medical devices, and/or artificial intelligence devices). Aspects may be implemented in chip-level components, modular components, non-modular components, non-chip-level components, device-level components, and/or system-level components. Devices incorporating described aspects and features may include additional components and features for implementation and practice of claimed and described aspects. For example, transmission and reception of wireless signals may include one or more components for analog and digital purposes (e.g., hardware components including antennas, radio frequency (RF) chains, power amplifiers, modulators, buffers, processors, interleavers, adders, and/or summers). It is intended that aspects described herein may be practiced in a wide variety of devices, components, systems, distributed arrangements, and/or end-user devices of varying size, shape, and constitution.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. One skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, or the like (collectively referred to as "elements"). These elements may be implemented using hardware, software, or combinations thereof. Whether such elements are implemented as hardware or software depends upon the particular application and design constraints imposed on the overall system.

While aspects may be described herein using terminology commonly associated with a 5G or New Radio (NR) radio access technology (RAT), aspects of the present disclosure can be applied to other RATs, such as a 3G RAT, a 4G RAT, and/or a RAT subsequent to 5G (e.g., 6G).

Figure 1:
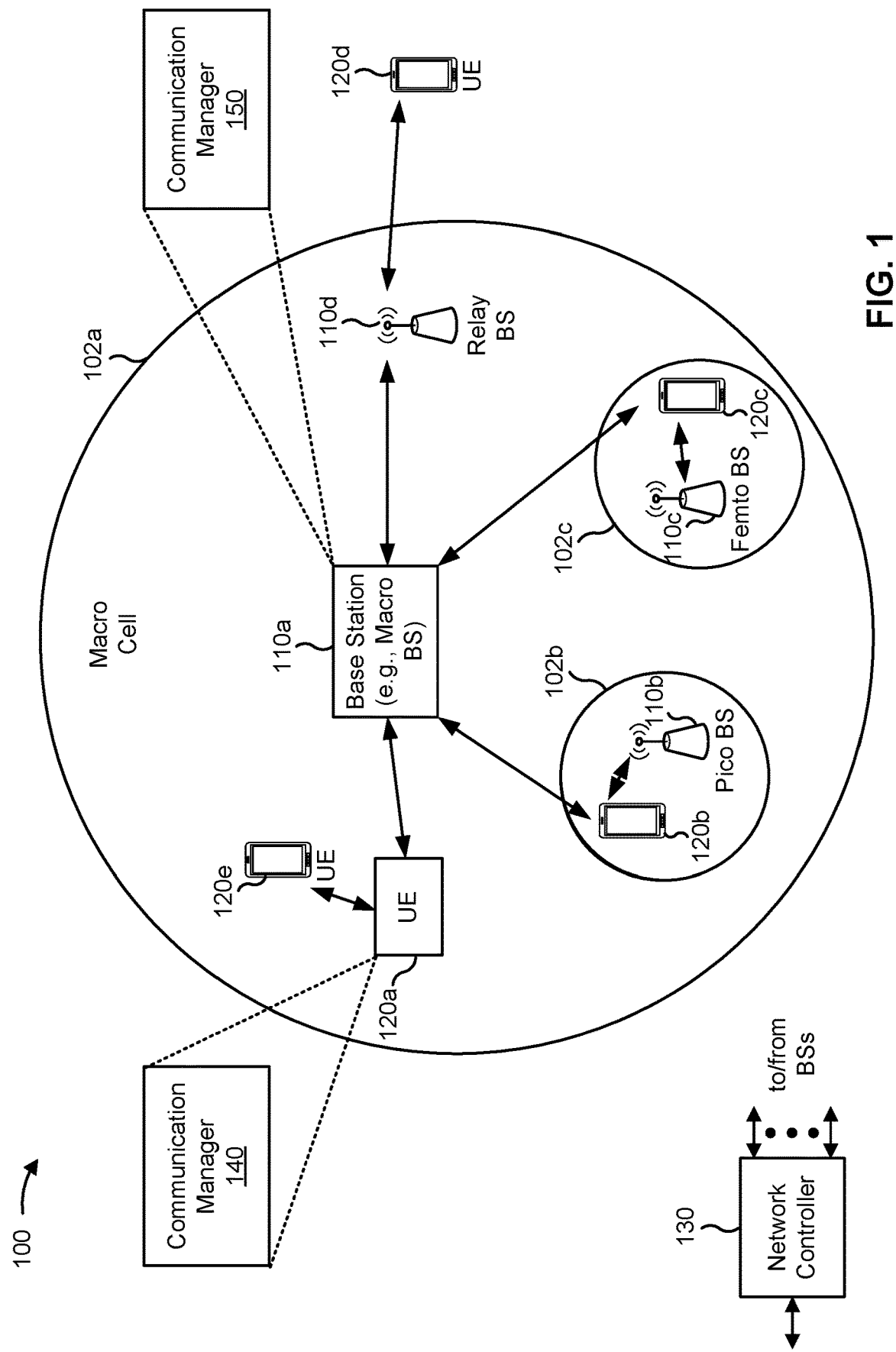
FIG. 1 is a diagram illustrating an example of a wireless network, in accordance with the present disclosure.

FIG. 1 is a diagram illustrating an example of a wireless network 100, in accordance with the present disclosure. The wireless network 100 may be or may include elements of a 5G (e.g., NR) network and/or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), and/or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, and/or a transmission reception point (TRP). Each base station 110 may provide communication coverage for a particular geographic area. In the Third Generation Partnership Project (3GPP), the term "cell" can refer to a coverage area of a base station 110 and/or a base station subsystem serving this coverage area, depending on the context in which the term is used.

A base station 110 may provide communication coverage for a macro cell, a pico cell, a femto cell, and/or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station. In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells.

In some aspects, the term "base station" (e.g., the base station 110) or "network node" or "network entity" may refer to an aggregated base station, a disaggregated base station (e.g., described in connection with FIG. 9), an integrated access and backhaul (IAB) node, a relay node, and/or one or more components thereof. For example, in some aspects, "base station," "network node," or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the term "base station," "network node," or "network entity" may refer to one device configured to perform one or more functions, such as those described herein in connection with the base station 110. In some aspects, the term "base station," "network node," or "network entity" may refer to a plurality of devices configured to perform the one or more functions. For example, in some distributed systems, each of a number of different devices (which may be located in the same geographic location or in different geographic locations) may be configured to perform at least a portion of a function, or to duplicate performance of at least a portion of the function, and the term "base station," "network node," or "network entity" may refer to any one or more of those different devices. In some aspects, the term "base station," "network node," or "network entity" may refer to one or more virtual base stations and/or one or more virtual base station functions. For example, in some aspects, two or more base station functions may be instantiated on a single device. In some aspects, the term "base station," "network node," or "network entity" may refer to one of the base station functions and not another. In this way, a single device may include more than one base station.

In some examples, a cell may not necessarily be stationary, and the geographic area of the cell may move according to the location of a base station 110 that is mobile (e.g., a mobile base station). In some examples, the base stations 110 may be interconnected to one another and/or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, a relay, or the like.

The wireless network 100 may be a heterogeneous network that includes base stations 110 of different types, such as macro base stations, pico base stations, femto base stations, relay base stations, or the like. These different types of base stations 110 may have different transmit power levels, different coverage areas, and/or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts).

A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

The UEs 120 may be dispersed throughout the wireless network 100, and each UE 120 may be stationary or mobile. A UE 120 may include, for example, an access terminal, a terminal, a mobile station, and/or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, and/or a satellite radio), a vehicular component or sensor, a smart meter/sensor, industrial manufacturing equipment, a global positioning system device, and/or any other suitable device that is configured to communicate via a wireless medium.

Some UEs 120 may be considered machine-type communication (MTC) or evolved or enhanced machine-type communication (eMTC) UEs. An MTC UE and/or an eMTC UE may include, for example, a robot, a drone, a remote device, a sensor, a meter, a monitor, and/or a location tag, that may communicate with a base station, another device (e.g., a remote device), or some other entity. Some UEs 120 may be considered Internet-of-Things (IoT) devices, and/or may be implemented as NB-IoT (narrowband IoT) devices. Some UEs 120 may be considered a Customer Premises Equipment. A UE 120 may be included inside a housing that houses components of the UE 120, such as processor components and/or memory components. In some examples, the processor components and the memory components may be coupled together. For example, the processor components (e.g., one or more processors) and the memory components (e.g., a memory) may be operatively coupled, communicatively coupled, electronically coupled, and/or electrically coupled.

In general, any number of wireless networks 100 may be deployed in a given geographic area. Each wireless network 100 may support a particular RAT and may operate on one or more frequencies. A RAT may be referred to as a radio technology, an air interface, or the like. A frequency may be referred to as a carrier, a frequency channel, or the like. Each frequency may support a single RAT in a given geographic area in order to avoid interference between wireless networks of different RATs. In some cases, NR or 5G RAT networks may be deployed.

In some examples, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), and/or a mesh network. In such examples, a UE 120 may perform scheduling operations, resource selection operations, and/or other operations described elsewhere herein as being performed by the base station 110.

Devices of the wireless network 100 may communicate using the electromagnetic spectrum, which may be subdivided by frequency or wavelength into various classes, bands, channels, or the like. For example, devices of the wireless network 100 may communicate using one or more operating bands. In 5G NR, two initial operating bands have been identified as frequency range designations FR1 (410 MHz-7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs with regard to FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics and/or FR2 characteristics, and thus may effectively extend features of FR1 and/or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz" or the like, if used herein, may broadly represent frequencies that may be less than 6 GHz, may be within FR1, or may include mid-band frequencies. Further, unless specifically stated otherwise, it should be understood that the term "millimeter wave" or the like, if used herein, may broadly represent frequencies that may include mid-band frequencies, may be within FR2, FR4, FR4-a or FR4-1, and/or FR5, or may be within the EHF band. It is contemplated that the frequencies included in these operating bands (e.g., FR1, FR2, FR3, FR4, FR4-a, FR4-1, and/or FR5) may be modified, and techniques described herein are applicable to those modified frequency ranges.

In some aspects, the UE 120 may include a communication manager 140. As described in more detail elsewhere herein, the communication manager 140 may obtain emission control information that indicates a first emission control configuration associated with a first operating configuration and a second emission control configuration associated with a second operating configuration; and transmit, using the first emission control configuration or the second emission control configuration based at least in part on a UE operating configuration associated with the UE, a communication. Additionally, or alternatively, the communication manager 140 may perform one or more other operations described herein.

In some aspects, the network entity may include a communication manager 150. As described in more detail elsewhere herein, the communication manager 150 may receive UE capability information associated with an aerial UE; and transmit emission control information that indicates a first emission control configuration associated with a first operating configuration and a second emission control configuration associated with a second operating configuration, the emission control information being based at least in part on the UE capability information. Additionally, or alternatively, the communication manager 150 may perform one or more other operations described herein.

As indicated above, FIG. 1 is provided as an example. Other examples may differ from what is described with regard to FIG. 1.

Figure 2:
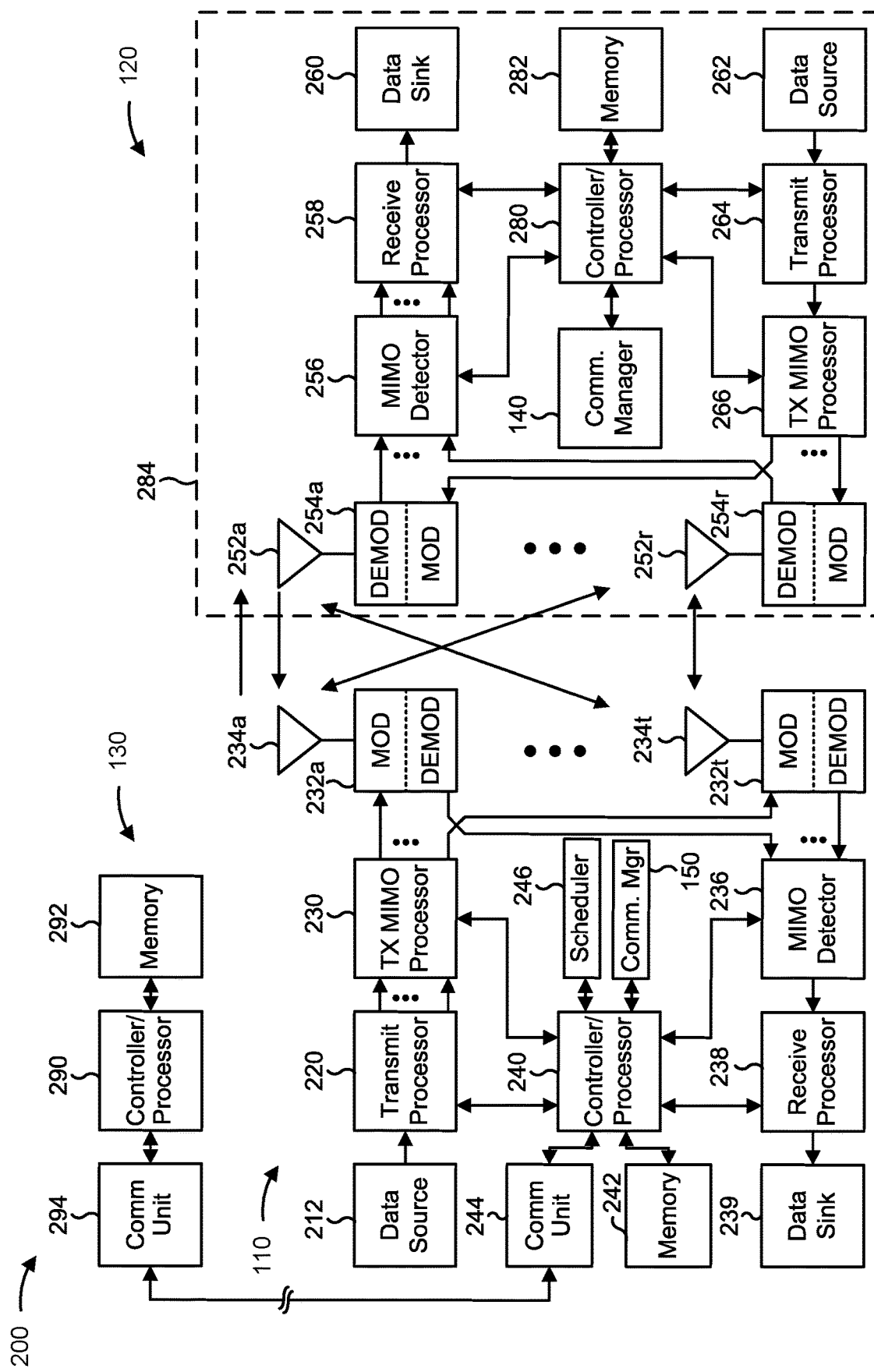
FIG. 2 is a diagram illustrating an example of a network entity in communication with a user equipment (UE) in a wireless network, in accordance with the present disclosure.

FIG. 2 is a diagram illustrating an example 200 of a base station 110 in communication with a UE 120 in a wireless network 100, in accordance with the present disclosure. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, and/or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, and/or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 and/or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, and/or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, and/or a CQI parameter, among other examples. In some examples, one or more components of the UE 120 may be included in a housing 284.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t and/or antennas 252a through 252r) may include, or may be included within, one or more antenna panels, one or more antenna groups, one or more sets of antenna elements, and/or one or more antenna arrays, among other examples. An antenna panel, an antenna group, a set of antenna elements, and/or an antenna array may include one or more antenna elements (within a single housing or multiple housings), a set of coplanar antenna elements, a set of non-coplanar antenna elements, and/or one or more antenna elements coupled to one or more transmission and/or reception components, such as one or more components of FIG. 2.

On the uplink, at the UE 120, a transmit processor 264 may receive and process data from a data source 262 and control information (e.g., for reports that include RSRP, RSSI, RSRQ, and/or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, and/or the TX MIMO processor 266. The transceiver may be used by a processor (e.g., the controller/processor 280) and the memory 282 to perform aspects of any of the methods described herein (e.g., with reference to FIGS. 3-9).

At the base station 110, the uplink signals from UE 120 and/or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink and/or uplink communications. In some examples, the modem 232 of the base station 110 may include a modulator and a demodulator. In some examples, the base station 110 includes a transceiver. The transceiver may include any combination of the antenna(s) 234, the modem (s) 232, the MIMO detector 236, the receive processor 238, the transmit processor 220, and/or the TX MIMO processor 230. The transceiver may be used by a processor (e.g., the controller/processor 240) and the memory 242 to perform aspects of any of the methods described herein (e.g., with reference to FIGS. 3-9).

The controller/processor 240 of the base station 110, the controller/processor 280 of the UE 120, and/or any other component(s) of FIG. 2 may perform one or more techniques associated with emission control of an aerial user equipment, as described in more detail elsewhere herein. For example, the controller/processor 240 of the base station 110, the controller/processor 280 of the UE 120, and/or any other component(s) of FIG. 2 may perform or direct operations of, for example, process 600 of FIG. 6, process 700 of FIG. 7, and/or other processes as described herein. The memory 242 and the memory 282 may store data and program codes for the base station 110 and the UE 120, respectively. In some examples, the memory 242 and/or the memory 282 may include a non-transitory computer-readable medium storing one or more instructions (e.g., code and/or program code) for wireless communication. For example, the one or more instructions, when executed (e.g., directly, or after compiling, converting, and/or interpreting) by one or more processors of the base station 110 and/or the UE 120, may cause the one or more processors, the UE 120, and/or the base station 110 to perform or direct operations of, for example, process 600 of FIG. 6, process 700 of FIG. 7, and/or other processes as described herein. In some examples, executing instructions may include running the instructions, converting the instructions, compiling the instructions, and/or interpreting the instructions, among other examples.

In some aspects, the UE includes means for obtaining emission control information that indicates a first emission control configuration associated with a first operating configuration and a second emission control configuration associated with a second operating configuration; and/or means for transmitting, using the first emission control configuration or the second emission control configuration based at least in part on a UE operating configuration associated with the UE, a communication. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the network entity includes means for receiving user equipment (UE) capability information associated with an aerial UE; and/or means for transmitting emission control information that indicates a first emission control configuration associated with a first operating configuration and a second emission control configuration associated with a second operating configuration, the emission control information being based at least in part on the UE capability information. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
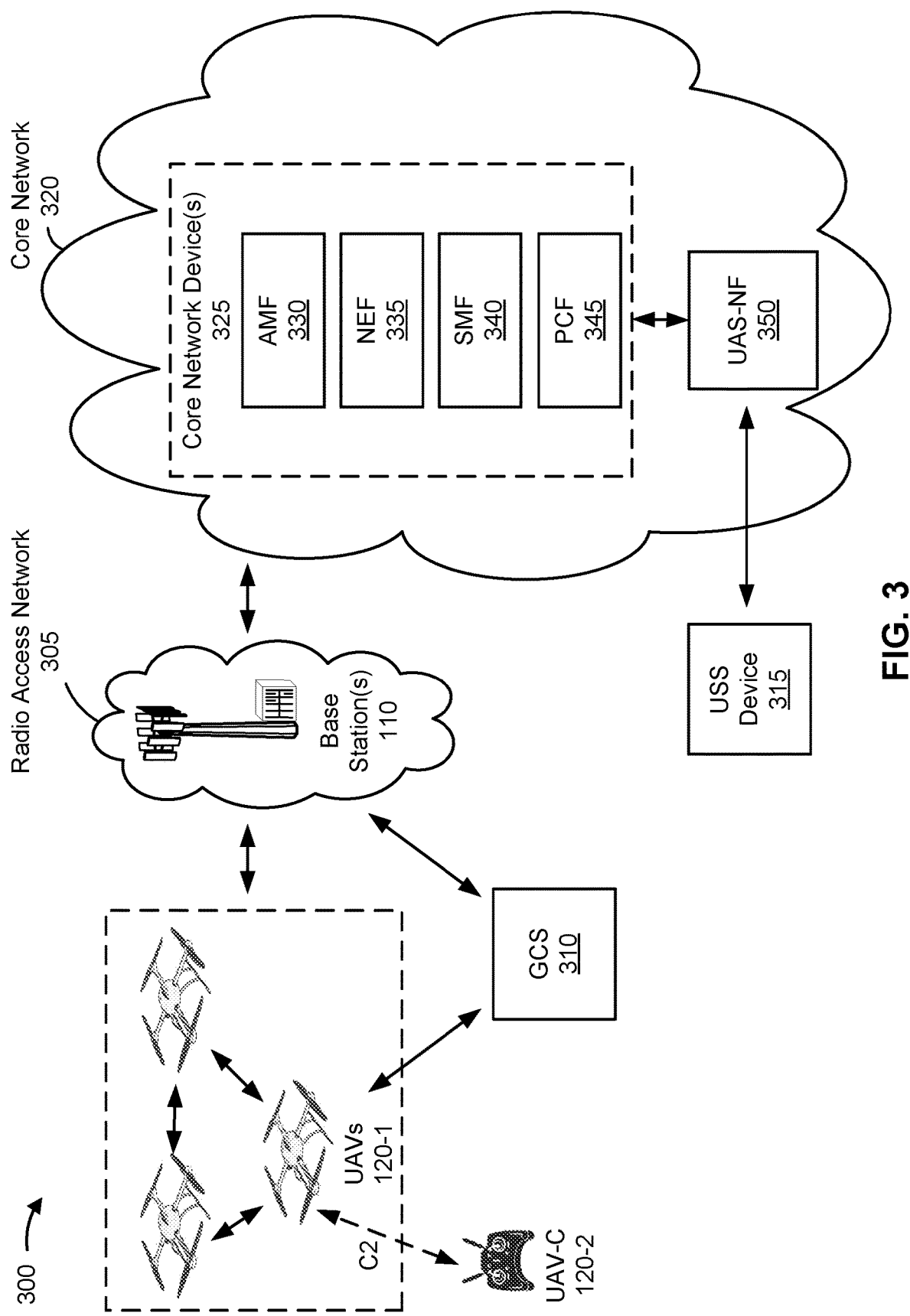
FIG. 3 is a diagram illustrating an example of one or more unmanned aerial vehicle (UAV) UEs 120 within a wireless communication network environment, in accordance with the present disclosure.

FIG. 3 is a diagram illustrating an example of unmanned aerial vehicle user equipments 120 (UAV UEs) within a wireless communication network environment 300, in accordance with the present disclosure. As shown in FIG. 3, the environment 300 can include one or more UEs 120, which may include one or more UAVs 120-1 and one or more UAV controllers (UAV-Cs) 120-2, a RAN 305, a core network 320, a UAV service supplier (USS) device 315, and a ground control system (GCS) 310. Devices of environment 300 can interconnect via wired connections, wireless connections, or a combination of wired and wireless connections.

The UAV 120-1 includes an aircraft without a human pilot aboard and can also be referred to as an unmanned aircraft (UA), a drone, a remotely piloted vehicle (RPV), a remotely piloted aircraft (RPA), a remotely operated aircraft (ROA), an aerial user equipment (aerial UE), or an uncrewed aerial vehicle. The UAV 120-1 may have a variety of shapes, sizes, configurations, characteristics, or the like for a variety of purposes and applications. In some implementations, the UAV 120-1 may include one or more sensors, such as an electromagnetic spectrum sensor (e.g., a visual spectrum, infrared, or near infrared camera, a radar system, or the like), a biological sensor, a temperature sensor, and/or a chemical sensor, among other examples. In some implementations, the UAV 120-1 may include one or more components for communicating with one or more base stations 110. Additionally, or alternatively, the UAV 120-1 may transmit information to and/or receive information from the GCS 310, such as sensor data, flight plan information, or the like. Such information can be communicated directly (e.g., via a radio resource control (RRC) signal and/or the like) and/or via the base stations 110 on the RAN 305. The UAV 120-1 may be a component of an unmanned aircraft system (UAS). The UAS may include the UAV 120-1, a UAV-C 120-2, and/or implement a communication system (such as wireless network environment 300 or another system of communication) between the UAV 120-1 and the UAV-C 120-2.

The RAN 305 may include one or more base stations 110 that provide access for the UAV UEs 120 to the core network 320. For example, the RAN 305 may include one or more aggregated base stations and/or one or more disaggregated base stations (e.g., including one or more CUs, one or more DUs, and/or one or more RUs). The UAV 120-1 may communicate with the base station 110 via the Uu interface. For example, the UAV 120-1 may transmit communications to the base station 110 and/or receive communications from the base station 110 via the Uu interface. Such Uu connectivity may be used to support different applications for the UAV 120-1, such as video transmission from the UAV 120-1 and/or command and control (C2) communications for remote command and control of the UAV 120-1, among other examples.

The GCS 310 may include one or more devices capable of managing the UAV 120-1 and/or flight plans for the UAV 120-1. For example, the GCS 310 may include a server device, a desktop computer, a laptop computer, or a similar device. In some examples, the GCS 310 may communicate with one or more devices of the environment 300 (e.g., the UAV 120-1, the USS device 315, and/or the like) to receive information regarding flight plans for the UAV UEs 120-1 and/or to provide recommendations associated with such flight plans. In some implementations, the GCS 310 may permit a user to control one or more of the UAVs 120-1 (e.g., via the UAV-C 120-2). Additionally, or alternatively, the GCS 310 can use a neural network and/or other artificial intelligence (AI) to control one or more of the UAVs 120-1. In some implementations, the GCS 310 may be included in a data center, a cloud computing environment, and/or a server farm, which may include multiple GCSs 310. While shown as being external from the core network 320 in FIG. 3, in some aspects, the GCS 310 may reside at least partially within the core network 320.

The USS device 315 includes one or more devices capable of receiving, storing, processing, and/or providing information associated with the UAV UEs 120 and/or the GCS 310. For example, the USS device 315 can include an application server, a desktop computer, a laptop computer, a tablet computer, a mobile phone, or a similar device. In some implementations, the UAVs 120-1 can interact with the USS device 315 to register a flight plan, receive approval, analysis, and/or recommendations related to a flight plan. The USS device 315 may register the UAV UE 120 with the USS device 315 by assigning an application-level UAV identifier to the UAV UE 120. The application-level UAV identifier may be an aviation administration (e.g., a regulatory body that governs aviation operation in a jurisdiction in which the USS device 315 and the UAV UE 120 are operating) UAV identifier.

The core network 320 includes a network that enables communications between the RAN 305 (e.g., the base stations 110) and one or more devices and/or networks connected to the core network 320. For example, the core network 320 may be a 5G core network. The core network 320 may include one or more core network devices 325, such as one or more access and mobility management functions (AMFs) (herein after referred to as an "AMF") 330, one or more network exposure functions (NEFs) herein after referred to as an "NEF") 335, one or more session management functions (SMFs) (herein after referred to as an "SMF") 340, one or more policy control functions (PCFs) (herein after referred to as a "PCF") 345, and/or other entities and/or functions that provide mobility functions for the UAV UEs 120 and enable the UAV UEs 120 to communicate with other devices of the environment 300.

The AMF 330 may include one or more network devices, such as one or more server devices, capable of managing authentication, activation, deactivation, and/or mobility functions associated with the UAV UE 120 connected to the core network 320. In some implementations, the AMF 330 may perform operations relating to authentication of the UAV 120-1. The AMF 330 may maintain a non-access stratum (NAS) signaling connection with the UAV 120-1.

The NEF 335 may include one or more network exposure devices, such as one or more server devices, capable of exposing capabilities, events, and/or information in one or more wireless networks to help other devices in the one or more wireless networks discover network services and/or utilize network resources efficiently. In some examples, the NEF 335 may receive traffic from and/or send traffic to the UAV 120-1 via the AMF 330 and the base station 110, and the NEF 335 may receive traffic from and/or send traffic to the USS device 315 via a UAS network function (UAS-NF) 350. In some examples, the NEF 335 may obtain a data structure, such as approval of a flight plan for the UAV 120-1, from the USS device 315 and divide the data structure into a plurality of data segments. In some examples, the NEF 335 may determine a location and/or reachability of the UAV 120-1 and/or a communication capability of the base station 110 to determine how to send the plurality of data segments to the UAV 120-1.

The SMF 340 may include one or more network devices, such as one or more server devices, capable of managing sessions for the RAN 305 and allocating addresses, such as Internet protocol (IP) addresses, to the UAVs 120-1. In some examples, the SMF 340 may perform operations relating to registration of the UAV 120-1. For example, the AMF 330 may receive a registration request from the UAV 120-1 and forward a request to the SMF 340 to create a corresponding packet data unit (PDU) session. The SMF 340 may allocate an address to the UAV 120-1 and establish the PDU session for the AMF 330.

The PCF 345 may include one or more network devices, such as one or more server devices, capable of managing traffic to and from the UAV UEs 120 through the RAN 305 and enforcing a quality of service (QoS) on the RAN 305. In some examples, the PCF 345 may implement charging rules and flow control rules, manage traffic priority, and/or manage a QoS for the UAVs 120-1.

The USS device 315 may communicate with the core network 320 using the UAS-NF 350. The UAS-NF 350 may be a service-based interface to enable the USS device 315 to provide information to the core network 320. For example, the USS device 315 may provide, via the UAS-NF 350, registration information associated with a registration between the UAV 120-1 and the USS device 315. The UAS-NF 350 may include a device, such as a server device, that is external to the core network 320, or the UAS-NF 350 may reside, at least partially, on a core network device 325 within the core network 320. In some aspects, the UAS-NF 350 may be co-located with the NEF 335. In some aspects, or more of the core network device(s) 325 and/or the UAS-NF 350 may correspond to network controller 130, as described above in connection with FIG. 1.

The UAV-C 120-2 may remotely control the UAV 120-1 by transmitting C2 communications to the UAV 120-1 and/or receiving C2 communications from the UAV 120-1. In some examples, the UAV-C 120-2 and the UAV 120-1 may use the Uu interface for the C2 communications. For example, the UAV-C 120-2 may transmit C2 communications to UAV 120-1 (and receive C2 communications from the UAV 120-1) via the base station 110. In some examples, the UAV-C 120-2 and the UAV 120-1 may use a non-cellular communication system (e.g., non-3GPP connectivity), such as wireless fidelity (Wi-Fi), for the C2 communications. In some cases, the UAV-C 120-2 may be capable of communicating via a PC5 interface (e.g., a device-to-device (D2D) interface) and/or may operate in a high frequency band (e.g., the 5.9 GHz band).

A data rate, an amount of data transmitted, and/or a duty cycle associated with C2 communications between a controller (e.g., the UAV-C 120-2) and a UAV (e.g., the UAV 120-1) or between a network entity (e.g., the base station 110) and a UAV (e.g., the UAV 120-1) may vary over time. For example, the amount of data and/or a data transmission rate may vary based at least in part on video control being enabled or disabled at the UAV 120-1. To illustrate, based at least in part on video control being enabled and/or determining to transmit a large quantity of data, the UAV 120-1 may transmit, and the UAV-C 120-2 or a network entity (e.g., the base station 110) may receive, video data in a first C2 communication at a first data rate (e.g., 4 megabits per second (Mbps) data rate) and based at least in part on a first duty cycle (e.g., 40 millisecond (msec) duty cycle). Based at least in part on video control being disabled and/or determining to transmit a small quantity of data, the UAV 120-1 may transmit, and the UAV-C 120-2 or a network entity (e.g., the base station 110) may receive, data and/or information in a second C2 communication at a second data rate (e.g., 100 kilobits per second (kbps) data rate) and based at least in part on a second duty cycle (e.g., a 1 second duty cycle). Thus, the UAV 120-1 may dynamically change data rates and/or duty cycles based at least in part on an amount of data being transmitted.

A C2 mode 1 communication may denote a C2 communication that excludes video data, uses a longer duty cycle, and/or uses a lower data rate relative to other C2 communications (e.g., a C2 mode 2 communication). A C2 mode 2 communication may denote a C2 communication that includes video data, uses a shorter duty cycle, and/or a faster data rate relative to other C2 communications (e.g., a C2 mode 1 communication). In some aspects, the C2 mode 1 communication may be associated with a first range of duty cycles and/or a first range of data rates. Alternatively or additionally, the C2 mode 2 communication may be associated with a second range of duty cycles and/or a second range of data rates. The first range of duty cycles may be lower and/or higher than the second range of duty cycles, and the first range of data rates may be slower and/or faster than the second range of data rates.

The variation in data rates and duty cycles associated with C2 communications may affect emission control associated with in-band and/or out-of-band (OOB) transmissions. Emission control may denote configuring a first transmission based at least in part on mitigating interference in a second transmission. As one example of emission control, governing entities that regulate wireless transmissions (e.g., Federal Communication Commission (FCC), International Telecommunication Union (ITU), or Ministry of Information Industry (MII)) may define a power level limit for emission control. In some aspects, a UAV (e.g., the UAV 120-1) operating in a region associated with a governing entity may generate a transmission based at least in part on an emission control requirement as defined by the governing entity (e.g., the power level limit).

A power level limit that mitigates interference associated with a C2 mode 1 communication (e.g., a communication that excludes video data, a communication with a longer duty cycle, and/or a communication with a lower data rate) may be sub-optimal and/or result in reduced performance when applied to a C2 mode 2 communication (e.g., a communication that includes video data, a communication with a shorter duty cycle, and/or a communication with a higher data rate). As one example, a power level limit that specifies strict control over power emissions (e.g., a lower power level and/or a small window of fluctuation in power) may cause, as the reduced performance, increased data recovery errors, reduced data throughput, and/or increased data transfer latency in a C2 mode 2 communication relative to a C2 mode 1 communication. As another example, a power level limit that specifies relaxed control over power emissions (e.g., a higher power level and/or a larger window of fluctuation in power) may cause more interference in adjacent frequency bands when applied to a C2 mode 2 communication relative to C2 mode 1 communications. Alternatively or additionally, the power level limit that specifies relaxed control over power emissions may cause increased interference to terrestrial UEs sharing spectrum with the UAV (e.g., when applied to a C2 mode 2 communication relative to C2 mode 1 communications). The increased interference may also reduce performance at the terrestrial UE.

Some techniques and apparatuses described herein provide emission control of an aerial UE. A UE (e.g., an aerial UE and/or a UAV UE) may obtain emission control information that indicates a first emission control configuration associated with a first operating configuration and a second emission control configuration associated with a second operating configuration. As one example, the UE may receive a transmission from a network entity, where the transmission indicates the emission control information. As another example, the UE may obtain pre-configured emission control information (e.g., from a file stored in memory at the UE or static information programmed at the UE). The UE may transmit a communication using the first emission control configuration or the second emission control configuration based at least in part on a UE operating configuration associated with the UE. To illustrate, the UE may transmit a C2 mode 1 communication based at least in part on the first emission control configuration and a C2 mode 2 communication based at least in part on the second emission control configuration. Thus, the UE may dynamically change between using the first emission control configuration and the second emission control configuration based at least in part on a current UE operating configuration associated with the UE as further described with regard to FIG. 4 and FIG. 5. An aerial UE may denote a device that includes a capability of operating while in an airborne state and/or a capability of maintaining the airborne state, such as a UAV UE. A terrestrial UE may denote a device that lacks the capability of maintaining the airborne state, such as a cellular mobile phone.

In some aspects, the UAV UE may utilize multiple emission control configurations based at least in part on a current operating height of the UAV UE. For example, a UAV UE may land on the ground or fly close to the ground at a first height that fails to satisfy an aerial threshold associated with defining a device as being aerial (e.g., the UAV UE flies at a height below the aerial threshold). Based at least in part on flying at the first height (and/or being on the ground), the UAV UE may operate in a terrestrial mode and/or may operate as a terrestrial UE. Operating in the terrestrial mode and/or as a terrestrial UE may include the UAV UE generating a transmission based at least in part on a first emission control configuration associated with terrestrial communications. Alternatively or additionally, the UAV UE may fly in the air at a second height that satisfies the aerial threshold and/or may operate in an aerial mode associated with being airborne. Operating in the aerial mode may include the UAV UE generating a transmission based at least in part on a second emission control configuration associated with an aerial communication. The aerial threshold may be pre-configured (e.g., stored in a memory of the UAV UE) or dynamically configured (e.g., by a network entity).

In some aspects, a network entity may receive UE capability information associated with an aerial UE. The network entity may transmit emission control information that indicates a first emission control configuration associated with a first operating configuration and a second emission control configuration associated with a second operating configuration, where the emission control information may be based at least in part on the UE capability information. In some aspects, the first operating configuration associated with the first emission control configuration may indicate one or more operating configuration parameters associated with a C2 mode 1 communication. Alternatively or additionally, the second operating configuration associated with the second emission control configuration may indicate one or more operating configuration parameters associated with a C2 mode 2 communication.

By dynamically changing between emission control configurations, a UE (e.g., an aerial UE and/or a UAV UE operating in an aerial mode) may apply different emission control configurations that are optimized to improve performance (e.g., reduce data recovery errors, increase data throughput, and/or decrease data transfer latency) for particular operating configurations (e.g., a first operating configuration associated with a C2 mode 1 communication and a second operating configuration associated with a C2 mode 2 communication) relative to a performance when using a single emission control configuration for the different operating configurations. Alternatively or additionally, dynamically changing between emission control configurations may reduce interference generated by the aerial UE and observed by a terrestrial UE communicating in adjacent or shared spectrum. The reduced interference may improve performance at the terrestrial UE.

As indicated above, FIG. 3 is provided as an example. Other examples may differ from what is described with respect to FIG. 3.

Figure 4:
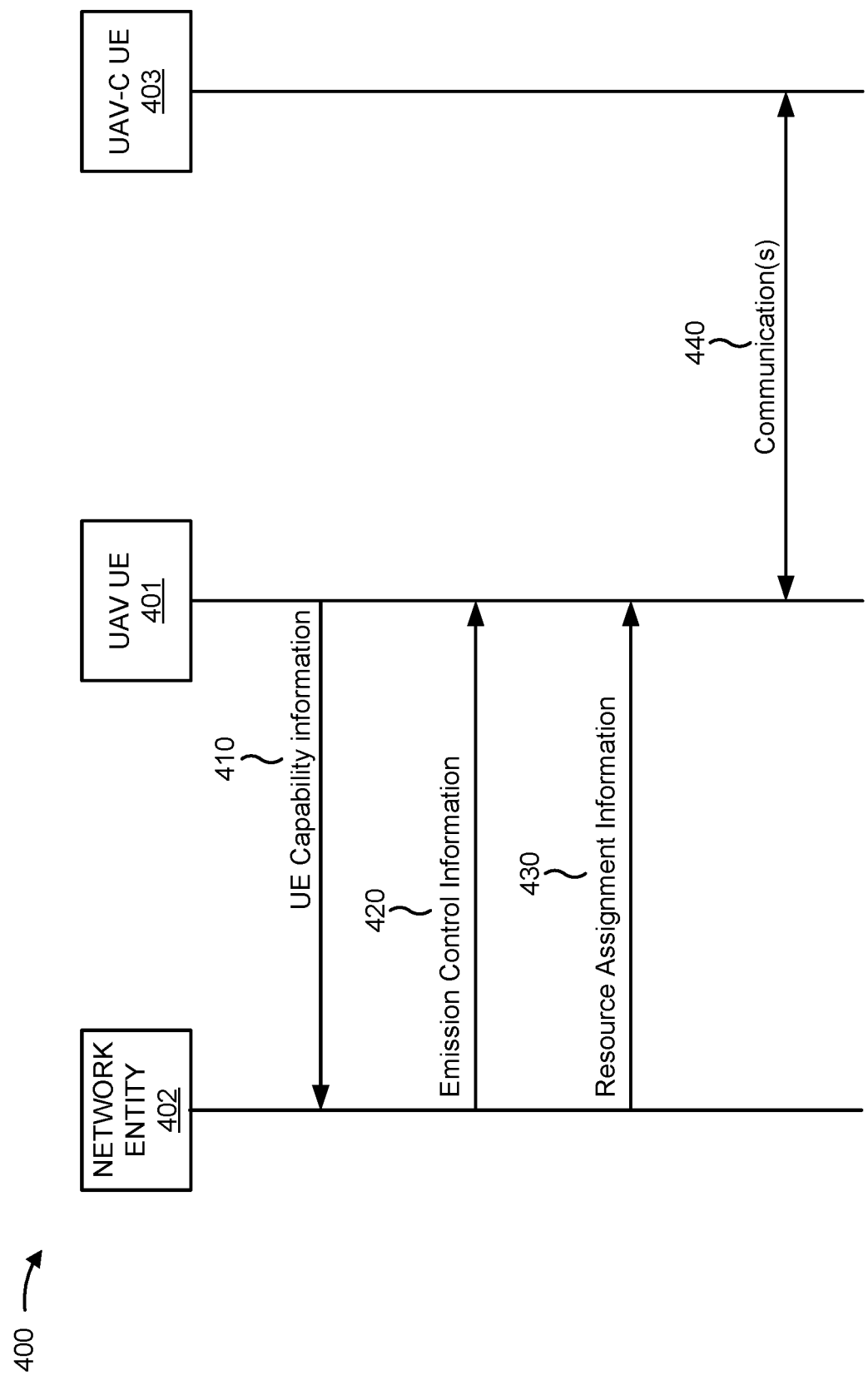
FIG. 4 is a diagram illustrating an example of a wireless communication process that may be performed, at least in part, by a UAV UE, a network entity, and/or an unmanned aerial vehicle-controller (UAV-C) UE in a wireless communication network, in accordance with the present disclosure.

FIG. 4 is a diagram illustrating an example 400 of a wireless communication process that may be performed, at least in part, by a UAV UE 401 (e.g., the UAV 120-2 or an apparatus 800), a network entity 402 (e.g., a base station 110 or an apparatus 900), and/or a UAV-C UE 403 (e.g., the UAV-C 120-1) in a wireless communication network, in accordance with the present disclosure.

As shown by reference number 410, the UAV UE 401 may transmit, and the network entity 402 may receive, UE capability information. In some aspects, the UAV UE 401 may indicate, in the UE capability information, a UE capability associated with an emission control configuration. As one example, the UAV UE 401 may indicate video capability information, such as support for video and/or support for video control. Alternatively or additionally, the UAV UE 401 may indicate aerial subscription information.

As shown by reference number 420, the network entity 402 may transmit, and the UAV UE 401 may receive, emission control information. To illustrate, the network entity 402 may transmit the emission control information using a unicast radio resource control message directed to the UAV UE 401, a system information block, network signaling, a medium access control (MAC) control element (CE), and/or downlink control information (DCI). In some aspects, the network entity 402 may include multiple emission control configurations in the emission control information, where each emission control configuration is associated with an operating configuration. To illustrate, the network entity 402 may include a first emission control configuration associated with a first operating configuration and a second emission control configuration associated with a second operating configuration. In some aspects, the network entity 402 may include and/or indicate operating configuration information with the emission control information.

One or more operating configuration parameters associated with an emission control configuration may be communicated and/or configured by RRC signaling. In some aspects, communicating an operating configuration parameter may denote indicating an operating configuration parameter that may be associated with an emission control configuration (e.g., an operating configuration parameter actively associated with the emission control configuration or an operating configuration parameter potentially associated with the emission control configuration). Configuring an operating configuration parameter may denote activating or deactivating an association between the operating configuration parameter and an emission control configuration. In some aspects, communicating an operating configuration parameter may implicitly activate an association between the operating configuration parameter and an emission control configuration (e.g., communicating the operating configuration parameter may include configuring the operating configuration parameter). Alternatively or additionally, an operating configuration parameter may be activated and/or deactivated by a MAC CE and/or by DCI. In some aspects, an operating configuration that includes multiple operating configuration parameters may be activated and/or deactivated via MAC CE and/or DCI. To illustrate, one or more operating configurations (e.g., that include multiple operating configuration parameters) may be communicated and/or configured by RRC signaling, and an operating configuration may be activated and/or deactivated (e.g., selected or de-selected for association with an emission control configuration) via MAC CE and/or DCI. Activating or deactivating an operating configuration may denote activating and/or deactivating all operating configuration parameters associated with the operating configuration.

Emission control information may indicate one or more emission control parameters associated with configuring a transmission based at least in part on emission control. As one example, the emission control information may include and/or indicate an emission control configuration parameter associated with a power level limit or a power spectral density (PSD) limit. An operating configuration may include one or more operating configuration parameters associated with a communication and/or a UE transmitting the communication, such as whether the communication is a C2 mode 1 communication or a C2 mode 2 communication. In some aspects, and as further described with regard to reference number 440, the UAV UE 401 may compare a current UE operating configuration (e.g., associated with the UAV UE 401) to an operating configuration associated with the emission control information to select an emission control configuration for a communication.

The network entity 402 may include, in the emission control information, different emission control parameters for different operating configurations. As one example, the network entity may include, in a first emission control configuration indicated by the emission control information, a first emission control configuration parameter associated with a frequency division multiplex operating configuration. In the same emission control information, the network entity 402 may include, in a second emission control configuration, a second emission control configuration parameter associated with a time division multiplex operating configuration. However, the first emission control configuration and the second emission control configuration may also be associated with a same operating configuration. To illustrate, the first emission control configuration associated with the frequency division multiplex operating configuration and the second emission control configuration associated with the time division multiplex operating configuration may each be associated with a C2 mode 1 communication operating configuration. Thus, the first emission control configuration may have a common or shared emission control configuration parameter with the second emission control configuration. In some aspects, an operating configuration associated with and/or indicates a C2 mode 1 communication and/or a C2 mode 2 communication may indicate a data rate associated with a C2 mode 1 communication and/or a C2 mode 2 communication, a data rate threshold associated with defining a C2 mode 1 communication and/or a C2 mode 2 communication, a duty cycle associated with a C2 mode 1 communication and/or a C2 mode 2 communication, and/or a duty cycle threshold with defining a C2 mode 1 communication and/or a C2 mode 2 communication.

As another example of an emission control configuration parameter, the network entity 402 may include, in the emission control information, a first emission control configuration parameter associated with a first frequency range (e.g., FR1, FR2, FR3, FR4, or FR5) operating configuration, and a second emission control configuration parameter associated with a second frequency range (e.g., FR1, FR2, FR3, FR4, or FR5) operating configuration. Alternatively or additionally, the network entity 402 may include a first emission control configuration parameter associated with a first uplink waveform operating configuration (e.g., an OFDM uplink waveform) and a second emission control configuration parameter associated with a second uplink waveform operating configuration (e.g., a Direct Fourier Transform Spread OFDM (DFT-s-OFDM) uplink waveform).

The emission control information may indicate an in-band PSD limit associated with an in-band transmission. In some aspects, the in-band transmission may be associated with a device (e.g., a UAV UE) communicating (e.g., transmitting and/or receiving) based at least in part on shared spectrum. As one example of shared spectrum, a UAV UE (e.g., the UAV UE 401) may communicate using a first portion of frequency that overlaps at least partially or fully with a second portion of frequency associated with a second device (e.g., a terrestrial UE). The emission control information may indicate an in-band PSD limit for a first transmission generated by the UAV UE, where the transmission may share spectrum with a second transmission associated with the terrestrial UE. In some aspects, the emission control information may indicate different in-band PSD limits for different operating configurations. To illustrate, the emission control information may indicate, in a first emission control configuration associated with a first operating configuration (e.g., communicating based at least in part on shared spectrum and/or communicating a C2 mode 1 communication), a first in-band PSD limit. The network entity 402 may also indicate, in a second emission control configuration associated with a second operating configuration (e.g., communicating based at least in part on shared spectrum and/or communicating a C2 mode 2 communication), a second in-band PSD limit. For such a combination of first and second operating configurations, the first in-band PSD limit indicated by the network entity 402 may be higher than the second in-band PSD limit indicated by the network entity 402.

In some aspects, the emission control information may indicate a same value for the first in-band PSD limit and second in-band PSD limit. For instance, the network entity 402 may indicate, in the emission control information, a same value for the first in-band PSD limit and the second in-band PSD limit. To illustrate, the network entity 402 may indicate the same value based at least in part on the first operating configuration and the second operating configuration each indicating, as an operating configuration, communicating based at least in part on partitioned spectrum as further described below.

The emission control information may include and/or indicate one or more OOB PSD limits as emission control configuration parameters. To illustrate, the network entity 402 may indicate, in the emission control information, a first OOB PSD limit in a first emission control configuration and a second OOB PSD limit in a second emission control configuration. The first emission control configuration may also indicate, as an emission control configuration parameter, a first frequency band adjacent to a terrestrial communication frequency band (e.g., a frequency band used by a terrestrial UE for transmitting and/or receiving communications). To illustrate, the network entity 402 may instruct, by way of the emission control information and an associated operating configuration, the UAV UE 401 to use the first frequency band adjacent to the terrestrial communication frequency band for C2 mode 1 communications. The second emission control configuration may indicate, as an emission control configuration parameter, a second frequency band that is non-adjacent to the terrestrial communication frequency band. Accordingly, in a similar manner, the network entity 402 may instruct the UAV UE 401 to use the second frequency band non-adjacent to the terrestrial communication frequency band for C2 mode 2 communications. For such a combination of OOB power level limits and frequency band operating configurations, the emission control information may indicate a first value for the first OOB power level limit that is lower than the second value for the second OOB power level limit.

In some aspects, the emission control information may indicate a first OOB power level limit that has a greater value than the second OOB power level limit. As one example, the emission control information may indicate that the first OOB power level limit is greater than the second OOB power level limit based at least in part on a first operating configuration being associated with a C2 mode 1 communication and a second operating configuration being associated with a C2 mode 2 communication. The first and second operating configurations may additionally indicate that the C2 mode 1 communication and the C2 mode 2 communication may be transmitted in a same frequency band (e.g., assigned to the UAV UE 401 for C2 communications and/or not assigned or shared with other devices). An operating configuration associated with and/or that indicates a C2 mode 1 communication and/or a C2 mode 2 communication may indicate a data rate associated with a C2 mode 1 communication and/or a C2 mode 2 communication, a data rate threshold associated with defining a C2 mode 1 communication and/or a C2 mode 2 communication, a duty cycle associated with a C2 mode 1 communication and/or a C2 mode 2 communication, and/or a duty cycle threshold with defining a C2 mode 1 communication and/or a C2 mode 2 communication.

As further described above, the emission control information may indicate one or more operating configurations, and each operating configuration may be associated with a respective emission control configuration. The emission control information may explicitly indicate and operating configuration or implicitly indicate an operating configuration. By associating each emission control configuration with an operating configuration, the network entity 402 may enable a device (e.g., the UAV UE 401) to select an emission control configuration configured based at least in part a particular operating configuration at the device. Relative to other emission control configurations, the selected emission control configuration may improve emission control (e.g., reduce resultant interference) and/or improve performance (e.g., reduce recovery errors, increase data throughput, and/or reduce data transfer latencies) in UAV UE communications and/or a terrestrial UE.

As one example, an operating configuration may indicate, as an operating configuration parameter, a C2 mode 1 communication or C2 mode 2 communication. For example, a first operating configuration associated with a first emission control configuration may include a C2 mode 1 communication operating configuration. A second operating configuration associated with a second emission control configuration may include a C2 mode 2 communication operating configuration. As further described, an operating configuration that indicates and/or is associated with a C2 mode 1 communication and/or a C2 mode 2 communication may, in some aspects, indicate a data rate associated with a C2 mode 1 communication and/or a C2 mode 2 communication, a data rate threshold associated with defining a C2 mode 1 communication and/or a C2 mode 2 communication, a duty cycle associated with a C2 mode 1 communication and/or a C2 mode 2 communication, and/or a duty cycle threshold with defining a C2 mode 1 communication and/or a C2 mode 2 communication.

As another example, an operating configuration may indicate, as an operating configuration parameter, a type of spectrum used by a UE for transmitting and/or receiving a communication, such as a shared spectrum or a partitioned spectrum. Shared spectrum may include the UE using at least a first portion of spectrum that overlaps (e.g., at least partially in frequency and time) with a second portion of spectrum associated with another device. Partitioned spectrum may include the UE communicating based at least in part on using frequency division multiplexing, time division multiplexing, and/or spatial division multiplexing.

In some aspects, an operating configuration may indicate, as an operating configuration parameter, a duty cycle associated with a C2 mode 1 communication or a duty cycle associated with a C2 mode 2 communication. To illustrate, the emission control information may include a first operating configuration that includes a first duty cycle and a second operating configuration that includes a second duty cycle, where the first duty cycle (e.g., associated with the C2 mode 1 communication) is longer than the second duty cycle (e.g., associated with the C2 mode 2 communication).

In some aspects, the network entity 402 may select the first emission control configuration and/or second emission control configuration based at least in part on a regulatory requirement associated with the network entity. To illustrate, a first network entity operating at a first location may have different emission rules and/or regulations than a second network entity operating at a second location. Thus, the network entity 402 may select the first and/or second emission control configurations based at least in part on a regulatory requirement associated with a location and/or governing entity associated with the network entity. Alternatively or additionally, the network entity 402 may select the first emission control configuration and/or the second emission control configuration based at least in part on a current operating state associated with the network entity, such as a number of user equipment associated with the network entity (e.g., connected to the network entity and/or registered with the network entity) and/or a current spectrum allocation configuration (e.g., an assigned frequency band, an assigned frequency sub-band, a number of assigned frequency bands, an assigned beam) associated with the network entity.

In some aspects, the network entity 402 may indicate an emission control configuration parameter (e.g., a spurious power level limit and/or a duty cycle) that is based at least in part on a dynamic value. To illustrate, the network entity may indicate, in the emission control information, a maximum duty cycle and a spurious power level limit. As further described with regard to reference number 440, a UE (e.g., the UAV UE 401) may generate a transmission based at least in part on the maximum duty cycle, the spurious power level limit, and a current operating configuration of the UE, such as a current duty cycle. For example, the network entity 402 may indicate that the spurious power level limit may be dynamically change, such as by increasing the spurious power level limit based at least in part on the current duty cycle associated with the UE being lower than the maximum duty cycle. Thus, a spurious power level limit as applied by a receiving device (e.g., the UAV UE 401) may be a dynamic value that is based at least in part on comparing the current duty cycle of the UE to the maximum duty cycle.

In some aspects, the network entity 402 may indicate, in the emission control information, a spurious emission power level limit adjustment and a duty cycle threshold associated with applying the spurious power level limit adjustment. As one example, the network entity 402 may configure the duty cycle threshold as a percentage, such as 10% or 20%, and indicate to use the spurious power level limit adjustment (e.g., in combination with a spurious power level limit) based at least in part on a current duty cycle of the UE satisfying the duty cycle threshold (e.g., being at least 10% below the maximum duty cycle).

In some aspects, the network entity 402 may include, in the emission control information, a maximum spurious power level limit and/or a scaling factor indicator. To illustrate, the scaling factor indicator may specify whether to use a scalar value or a non-scalar value. As one example, the network entity 402 may indicate, as the scaling factor indicator, a linear scaling value. The network entity 402 may further indicate to use, as a spurious power level limit, a scaled version of the maximum spurious power level limit that is based at least in part on the maximum duty cycle and/or a current duty cycle of a UE. For instance, the scaled version of the maximum spurious power level limit may be based at least in part on the linear scaling value and/or a ratio of the current duty cycle and the maximum duty cycle.

As another example, the network entity 402 may indicate an identifier (ID) of a non-linear scaling function. The network entity may further indicate to calculate the spurious power level limit based at least in part on any combination of the maximum spurious power level limit, the maximum duty cycle, the current duty cycle of the UE, and/or the identified non-linear scaling function. The maximum duty cycle may be calculated and/or based at least in part on a time window (e.g., a first time duration) and a maximum on time (e.g., a second time duration associated with an active transmission) within the time window. Similarly, the current duty cycle of the UE may be calculated and/or based at least in part on the same time window (e.g., the first time duration) and an on time associated with an active transmission of the UE (e.g., a third dime duration) during the time window.

In some aspects, the network entity 402 may indicate, in the emission control information, a spurious power level limit that is based at least in part on an aerial subscription associated with the UE (e.g., indicated in the UE capability information). To illustrate, the network entity 402 may select a first spurious power level limit for a first UE that has an aerial subscription (e.g., a subscription to network access) and a second spurious power level limit for a second UE that does not have the aerial subscription and/or access to the network. The first spurious power level limit may be with a higher power level limit, relative to the second spurious power level limit.

Similar to a spurious power level limit, the network entity 402 may indicate, in the emission control information, a duty cycle limit that is based at least in part on a dynamic value. To illustrate, the network entity 402 may indicate that the duty cycle limit may be dynamically changed based at least in part on an operating height associated with the UE and/or a location of the UE. For instance, the network entity 402 may indicate that the duty cycle limit may be 100% of the indicated value for an operating height of 10 meters (m), 50% of the indicated value for an operating height between 10-50 m, and 10% of the indicated value for an operating height above 50 m. In some aspects, the network entity 402 may indicate to dynamically change or conditionally use the duty cycle limit based at least in part on a location. As one example, the network entity 402 may indicate to use and/or change the duty cycle limit based at least in part on operating within a geofence. In some aspects, the network entity 402 may indicate multiple duty cycle limits (e.g., static duty cycle limits instead of a dynamic duty cycle limit) in the emission control information, where each duty cycle limit is associated with respective operating condition.

In some aspects, the emission control information may indicate a spurious emission power level limit and one or more spurious emission power level adjustments, where a spurious emission power level limit adjustment may be associated and/or based at least in part on a frequency band and/or carrier frequency. For example, the network entity 402 may indicate, in the emission control information, a first spurious emission power level adjustment associated with a first frequency band and a second spurious emission power level adjustment associated with a second frequency band. In some aspects, a spurious emission power level adjustment may be considered an emission control configuration parameter while a frequency band may be considered an operating configuration. Thus, the network entity 402 may indicate to use the first or second emission power level adjustment based at least in part on a current operating configuration at a UE (e.g., a current transmission frequency band or a current carrier frequency).

Alternatively or additionally, the network entity 402 may indicate a duty cycle threshold, such as a percentage value as further described above. In some aspects, the network entity 402 may indicate to utilize the first spurious emission power level adjustment or the second spurious emission power level adjustment based at least in part on the duty cycle threshold. To illustrate, the network entity 402 may indicate to conditionally use the first spurious power level limit adjustment based at least in part on the UE satisfying a first operating configuration associated with the first frequency band and a second operating configuration associated with a current duty cycle of the UE satisfying the duty cycle threshold (e.g., the current duty cycle being a percentage value below a maximum duty cycle).

As shown by reference number 430, the network entity 402 may transmit, and the UAV UE 401 may receive, resource assignment information. As one example, the network entity 402 may assign a frequency resource and/or a time resource to the UAV UE 401 for C2 communications between the UAV UE 401 and the UAV-C UE 403. While the example 400 shows the resource assignment information being transmitted separately from the emission control information, other examples may include the network entity 402 transmitting the resource assignment information in a same transmission as the emission control information. Alternatively, the resource assignment information and the emission control information may each be communicated by the network entity 402 to the UAV UE 401 based at least in part on multiple transmissions.

As shown by reference number 440, the UAV UE 401 may communicate with the UAV-C UE 403 based at least in part on the emission control information described with regard to the reference number 420. To illustrate, the UAV UE 401 may use a current operating configuration associated with the UAV UE 401 to select an emission control configuration for a transmission. As one example, the UAV UE 401 may have video control disabled and, based at least in part on video control being disabled, configure the communication as a C2 mode 1 communication. To configure the communication, the UAV UE 401 may select a longer duty cycle and/or a lower data rate for transmitting the C2 mode 1 communication (e.g., relative to a C2 mode 2 communication). The UAV UE 401 may select, from the emission control information, an emission control configuration associated with the longer duty cycle, the lower data rate, and/or the C2 mode 1 communication. Alternatively or additionally, the UAV UE 401 may select the emission control configuration based at least in part on communicating using shared spectrum or partition spectrum.

Communicating based at least in part on the emission control information may include the UAV UE 401 adjusting a transmission power level (e.g., based at least in part on an OOB PSD limit or an in-band PSD limit) and/or selecting a frequency band (e.g., adjacent to a terrestrial communication band or non-adjacent to the terrestrial communication band). In some aspects, the UAV UE 401 may dynamically change emission control configuration, such as based at least in part on receiving an instruction to enable video control while operating with video control disabled. While operating based at least in part on a first emission control configuration associated with video being disabled, the UAV UE 401 may dynamically select a second emission control configuration associated with video control being enabled and alter a transmission based at least in part on the second emission control configuration. In some aspects, the UAV UE 401 may use a spurious emission power level adjustment based at least in part on a current duty cycle, a current operating height, and/or a current frequency band. Alternatively or additionally, the UAV UE 401 may adjust a duty cycle based at least in part on the current operating height.

By dynamically changing emission control configurations, an aerial UE may reduce data recovery errors, increase data throughput, and/or decrease data transfer latency in C2 mode 1 and mode 2 communications relative to using a single emission control configuration for both C2 mode 1 and mode 2 communications. Dynamically changing between emission control configurations may also reduce interference associated with the aerial UE and observed by a terrestrial UE, which may improve performance (e.g., reduce data recovery errors, increase data throughput, and/or decrease data transfer latency) at the terrestrial UE.

As indicated above, FIG. 4 is provided as an example. Other examples may differ from what is described with respect to FIG. 4.

Figure 5:
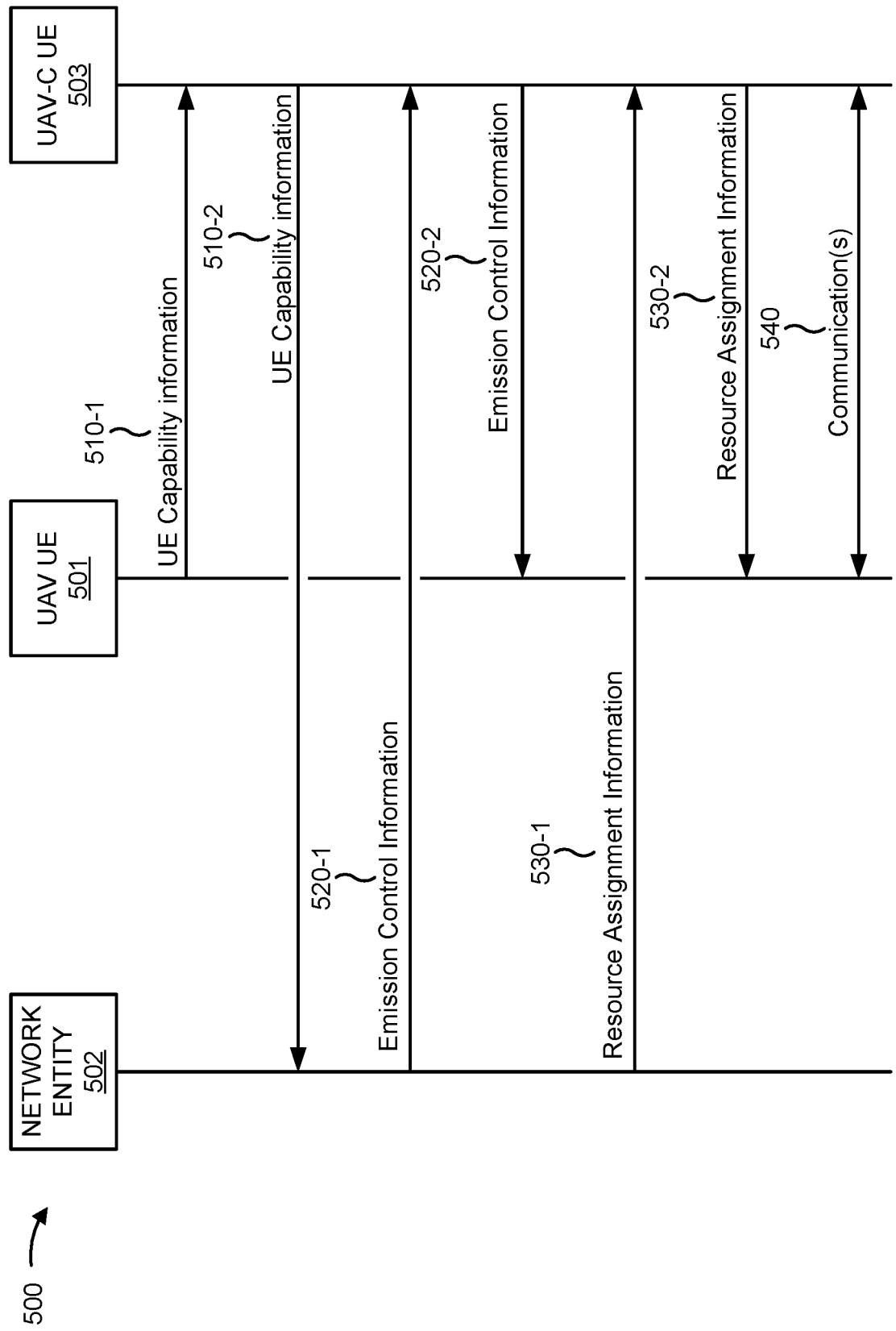
FIG. 5 is a diagram illustrating an example of a wireless communication process that may be performed, at least in part, by a UAV UE, a network entity, and/or a UAV-C UE in a wireless communication network, in accordance with the present disclosure.

FIG. 5 is a diagram illustrating an example 500 of a wireless communication process that may be performed, at least in part, by a UAV UE 501 (e.g., the UAV UE 120-2 or an apparatus 800), a network entity 502 (e.g., a base station 110 or an apparatus 900), and/or a UAV-C UE 503 (e.g., the UAV-C UE 120-1) in a wireless communication network, in accordance with the present disclosure.

In some aspects, the UAV-C UE 503 may perform as a relay between the UAV UE 501 and the network entity 502. To illustrate, and as shown by reference number 510-1, the UAV UE 501 may transmit, and the UAV-C UE 503 may receive, UE capability information in a similar manner as shown by the reference number 410 and described with regard to FIG. 4. For example, the UE capability information may include aerial subscription information and/or video capability information associated with the UAV UE 501. Based at least in part on receiving the UE capability information, the UAV-C UE 503 may transmit, and the network entity 502 may receive, the UE capability information as shown by reference number 510-2.

As shown by reference number 520-1, the network entity 502 may transmit, and the UAV-C UE 503 may receive, emission control information in a similar manner as shown by the reference number 420 and described with regard to FIG. 4. For example, the emission control information may include one or more emission control configurations associated with one or more operating configurations. In some aspects, the emission control information may indicate (explicitly or implicitly) one or more operating configurations. Based at least in part on receiving the emission control information, the UAV-C UE 503 may transmit, and the UAV UE 501 may receive, the emission control information as shown by reference number 520-2.

As shown by reference number 530-1, the network entity 502 may transmit, and the UAV-C UE 503 may receive, resource assignment information in a similar manner as shown by the reference number 430 and described with regard to FIG. 4. Based at least in part on receiving the resource assignment information, the UAV-C UE 503 may transmit, and the UAV UE 501 may receive, the resource assignment information as shown by reference number 530-2.

As shown by reference number 540, the UAV UE 501 may communicate with the UAV-C UE 503 based at least in part on the emission control information shown by the reference number 520-1 and the reference number 520-2. For example, the UAV UE 501 may adjust a transmission power level (e.g., based at least in part on an OOB PSD limit or an in-band PSD limit) and/or select a frequency band (e.g., adjacent to a terrestrial communication band or non-adjacent to the terrestrial communication band) based at least in part on selecting an emission control configuration associated with a current UE operating configuration of the UAV UE 501. Alternatively or additionally, the UAV UE 501 may dynamically select a second emission control configuration based at least in part on a change to a current operating configuration associated with the UAV UE 501. Based at least in part on selecting the second emission control configuration, the UAV-C UE 503 may alter communications as further described.

As indicated above, FIG. 5 is provided as an example. Other examples may differ from what is described with respect to FIG. 5.

Figure 6:
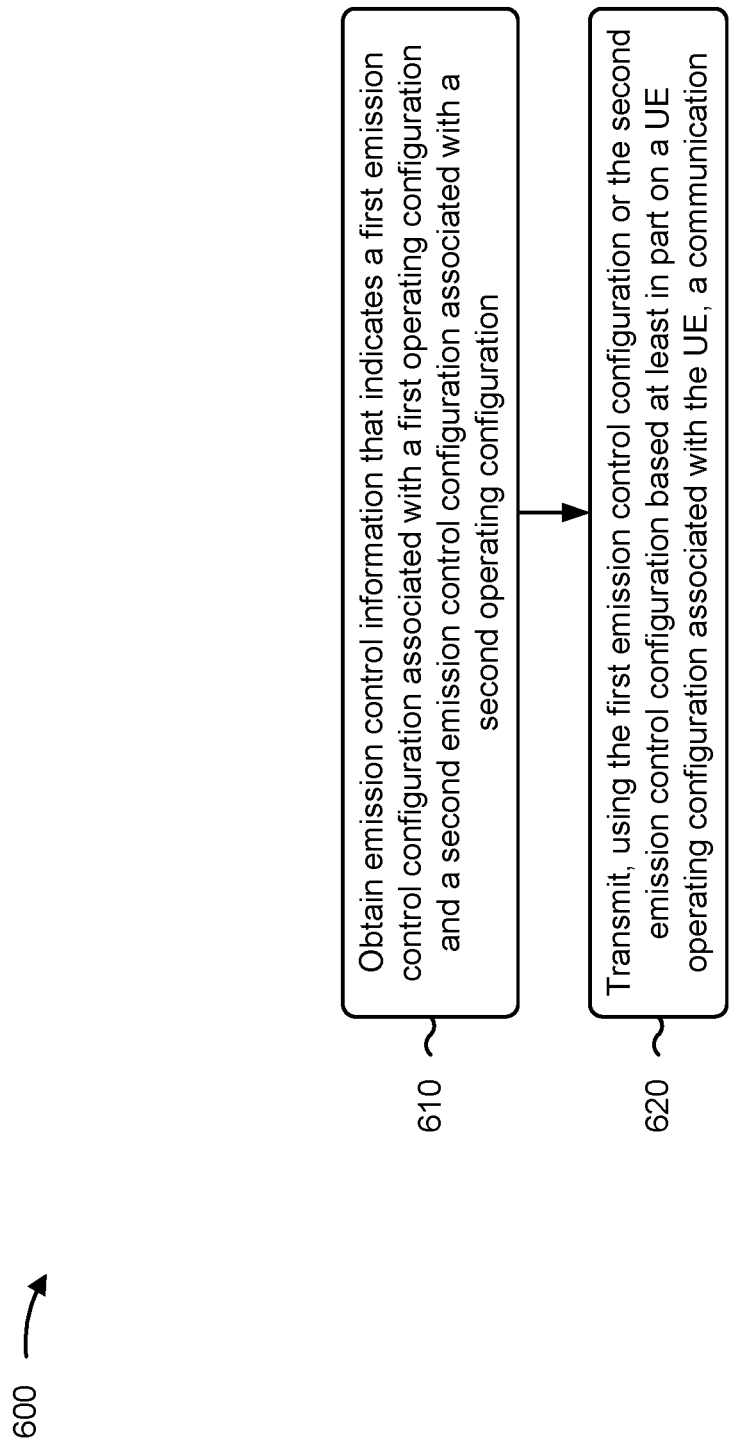
FIG. 6 is a diagram illustrating an example process performed, for example, by a UE, in accordance with the present disclosure.

FIG. 6 is a diagram illustrating an example process 600 performed, for example, by a UE, in accordance with the present disclosure. Example process 600 is an example where the UE (e.g., UE 120) performs operations associated with emission control of an aerial user equipment.

As shown in FIG. 6, in some aspects, process 600 may include obtaining emission control information that indicates a first emission control configuration associated with a first operating configuration and a second emission control configuration associated with a second operating configuration (block 610). For example, the UE (e.g., using communication manager 140 and/or emission control manager component 808, depicted in FIG. 8) may obtain emission control information that indicates a first emission control configuration associated with a first operating configuration and a second emission control configuration associated with a second operating configuration, as described above.

As further shown in FIG. 6, in some aspects, process 600 may include transmitting, using the first emission control configuration or the second emission control configuration based at least in part on a UE operating configuration associated with the UE, a communication (block 620). For example, the UE (e.g., using communication manager 140 and/or transmission component 804, depicted in FIG. 8) may transmit, using the first emission control configuration or the second emission control configuration based at least in part on a UE operating configuration associated with the UE, a communication, as described above.

Process 600 may include additional aspects, such as any single aspect or any combination of aspects described below and/or in connection with one or more other processes described elsewhere herein.

In a first aspect, obtaining the emission control information further comprises receiving the emission control information based at least in part on at least one of a unicast radio resource control message, a system information block, network signaling, a MAC CE, or downlinking control information.

In a second aspect, obtaining the emission control information further comprises obtaining the emission control information based at least in part on pre-configured emission control information.

In a third aspect, the first operating configuration comprises a C2 mode 1 communication and the second operating configuration comprises a C2 mode 2 communication, wherein the first emission control configuration indicates a first OOB power level limit and the second emission control configuration indicates a second OOB power level limit, and wherein the first OOB power level limit is greater than the second OOB power level limit.

In a fourth aspect, the C2 mode 1 communication is associated with a first data rate and a first duty cycle, wherein the C2 mode 2 communication is associated with a second data rate and a second duty cycle, wherein the first data rate is lower than the second data rate, and wherein the first duty cycle is longer than the second duty cycle.

In a fifth aspect, the first operating configuration comprises a C2 mode 1 communication and the second operating configuration comprises a C2 mode 2 communication, and wherein the first emission control configuration indicates a first frequency band adjacent to a terrestrial communication frequency band and the second emission control configuration indicates a second frequency band non-adjacent to the terrestrial communication frequency band.

In a sixth aspect, the first emission control configuration indicates a first OOB power spectral density limit, and the second emission control configuration indicates a second OOB power spectral density limit, and wherein the first OOB power spectral density limit is lower than the second OOB power spectral density limit.

In a seventh aspect, the first operating configuration comprises a first duty cycle, and the second operating configuration comprises a second duty cycle, and wherein the first duty cycle is longer than the second duty cycle.

In an eighth aspect, the first operating configuration comprises a C2 mode 1 communication and communicating based at least in part on shared spectrum, wherein the second operating configuration includes a C2 mode 2 communication and communicating based at least in part on shared spectrum, wherein the first emission control configuration indicates a first in-band PSD limit and the second emission control configuration indicates a second in-band PSD limit, and wherein the first in-band PSD limit is higher than the second in-band PSD limit.

In a ninth aspect, the first operating configuration comprises a C2 mode 1 communication and communicating based at least in part on a partitioned spectrum, wherein the second operating configuration comprises a C2 mode 2 communication and communicating based at least in part on the partitioned spectrum, wherein the first emission control configuration indicates a first in-band PSD limit and the second emission control configuration indicates a second in-band PSD limit, and wherein the first in-band PSD limit is a same value as the second in-band PSD limit.

In a tenth aspect, the partitioned spectrum comprises at least one of frequency division multiplexing, time division multiplexing, or spatial division multiplexing.

In an eleventh aspect, process 600 includes transmitting UE capability information, and wherein obtaining the emission control information further comprises receiving the emission control information based at least in part on transmitting the UE capability information.

In a twelfth aspect, the UE capability information comprises at least one of aerial subscription information associated with the UE, or video capability information associated with the UE.

In a thirteenth aspect, the emission control information comprises a first emission control configuration parameter associated with a frequency division multiplex operating configuration, and a second emission control configuration parameter associated with a time division multiplex operating configuration.

In a fourteenth aspect, the emission control information comprises a first emission control configuration parameter associated with a frequency range 1 operating configuration, and a second emission control configuration parameter associated with a frequency range 2 operating configuration.

In a fifteenth aspect, the emission control information comprises a first emission control configuration parameter associated with a first uplink waveform configuration, and a second emission control configuration parameter associated with a second uplink waveform configuration.

In a sixteenth aspect, the emission control information indicates a maximum duty cycle, and a spurious power level limit associated with the maximum duty cycle, wherein the emission control information further indicates to increase the spurious power level limit based at least in part on a current duty cycle associated with the UE being lower than the maximum duty cycle.

In a seventeenth aspect, the emission control information indicates a spurious emission power level limit adjustment, and a duty cycle threshold associated with applying the spurious power level limit adjustment.

In an eighteenth aspect, the emission control information indicates a maximum duty cycle, a maximum spurious power level limit, and a scaling factor indicator associated with the maximum duty cycle and the maximum spurious power level limit.

In a nineteenth aspect, the emission control information indicates a linear scaling value, or a non-linear scaling function identifier.

In a twentieth aspect, the duty cycle is based at least in part on a time window and a maximum on time within the time window.

In a twenty-first aspect, the emission control information indicates a current operating height associated with the UE, or a geofence.

In a twenty-second aspect, the emission control information indicates a spurious emission power level limit, a first spurious emission power level adjustment associated with a first frequency band, a second spurious emission power level adjustment associated with a second frequency band, and a duty cycle threshold, wherein the emission control information further indicates to utilize the first spurious emission power level adjustment or the second spurious emission power level adjustment based at least in part on a current duty cycle associated with the UE, and a frequency band associated with a UE transmission.

In a twenty-third aspect, the emission control information indicates a spurious power level limit that is based at least in part on an aerial subscription associated with the UE.

Although FIG. 6 shows example blocks of process 600, in some aspects, process 600 may include additional blocks, fewer blocks, different blocks, or differently arranged blocks than those depicted in FIG. 6. Additionally, or alternatively, two or more of the blocks of process 600 may be performed in parallel.

Figure 7:
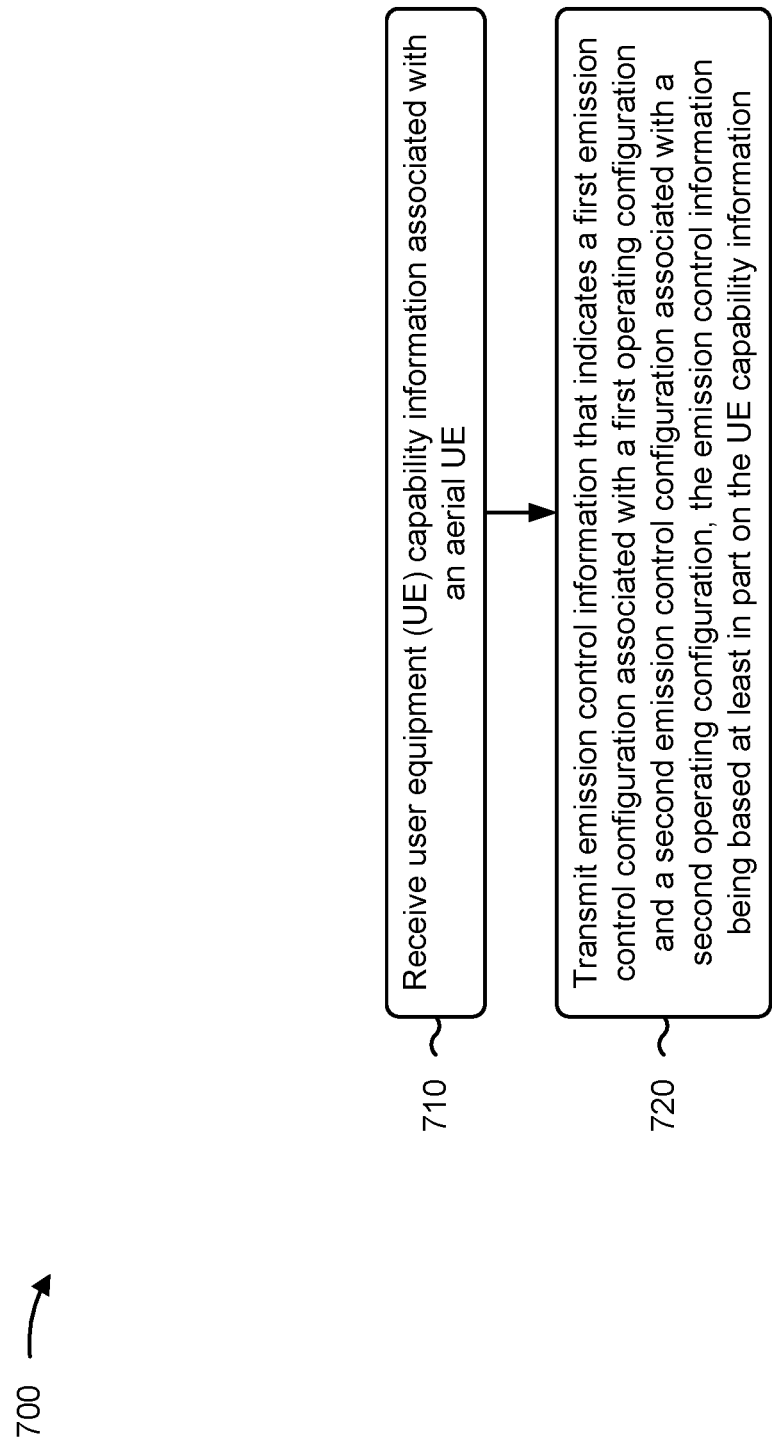
FIG. 7 is a diagram illustrating an example process performed, for example, by a network entity, in accordance with the present disclosure.

FIG. 7 is a diagram illustrating an example process 700 performed, for example, by a network entity, in accordance with the present disclosure. Example process 700 is an example where the network entity (e.g., network entity 402, network entity 502, or apparatus 900) performs operations associated with emission control of an aerial user equipment.

As shown in FIG. 7, in some aspects, process 700 may include receiving UE capability information associated with an aerial UE (block 710). For example, the network entity (e.g., using communication manager 150 and/or reception component 902, depicted in FIG. 9) may receive UE capability information associated with an aerial UE, as described above.

As further shown in FIG. 7, in some aspects, process 700 may include transmitting emission control information that indicates a first emission control configuration associated with a first operating configuration and a second emission control configuration associated with a second operating configuration, the emission control information being based at least in part on the UE capability information (block 720). For example, the network entity (e.g., using communication manager 150 and/or transmission component 904, depicted in FIG. 9) may transmit emission control information that indicates a first emission control configuration associated with a first operating configuration and a second emission control configuration associated with a second operating configuration, the emission control information being based at least in part on the UE capability information, as described above.

Process 700 may include additional aspects, such as any single aspect or any combination of aspects described below and/or in connection with one or more other processes described elsewhere herein.

In a first aspect, transmitting the emission control information further comprises transmitting the emission control information based at least in part on at least one of a unicast radio resource control message, a system information block, network signaling, a MAC CE, or downlinking control information.

In a second aspect, the first operating configuration comprises a C2 mode 1 communication and the second operating configuration comprises a C2 mode 2 communication, wherein the first emission control configuration indicates a first OOB power level limit and the second emission control configuration indicates a second OOB power level limit, and wherein the first OOB power level limit is greater than the second OOB power level limit.

In a third aspect, the C2 mode 1 communication is associated with a first data rate and a first duty cycle, wherein the C2 mode 2 communication is associated with a second data rate and a second duty cycle, wherein the first data rate is lower than the second data rate, and wherein the first duty cycle is longer than the second duty cycle.

In a fourth aspect, the first operating configuration comprises a C2 mode 1 communication and the second operating configuration comprises a C2 mode 2 communication, and wherein the first emission control configuration indicates a first frequency band adjacent to a terrestrial communication frequency band and the second emission control configuration indicates a second frequency band non-adjacent to the terrestrial communication frequency band.

In a fifth aspect, the first emission control configuration indicates a first OOB power spectral density limit, and the second emission control configuration indicates a second OOB power spectral density limit, and wherein the first OOB power spectral density limit is lower than the second OOB power spectral density limit.

In a sixth aspect, the first operating configuration comprises a first duty cycle, and the second operating configuration comprises a second duty cycle, and wherein the first duty cycle is longer than the second duty cycle.

In a seventh aspect, the first operating configuration comprises a C2 mode 1 communication and communicating based at least in part on shared spectrum, wherein the second operating configuration comprises a C2 mode 2 communication and communicating based at least in part on the shared spectrum, wherein the first emission control configuration indicates a first in-band PSD limit and the second emission control configuration indicates a second in-band PSD limit, and wherein the first in-band PSD limit is higher than the second in-band PSD limit.

In an eighth aspect, the first operating configuration comprises a C2 mode 1 communication and communicating based at least in part on a partitioned spectrum, wherein the second operating configuration comprises a C2 mode 2 communication and communicating based at least in part on the partitioned spectrum, wherein the first emission control configuration indicates a first in-band PSD limit and the second emission control configuration indicates a second in-band PSD limit, and wherein the first in-band PSD limit is a same value as the second in-band PSD limit.

In a ninth aspect, the partitioned spectrum comprises at least one of frequency division multiplexing, time division multiplexing, or spatial division multiplexing.

In a tenth aspect, the UE capability information comprises at least one of aerial subscription information associated with the UE, or video capability information associated with the UE.

In an eleventh aspect, the emission control information comprises a first emission control configuration parameter associated with a frequency division multiplex operating configuration, and a second emission control configuration parameter associated with a time division multiplex operating configuration.

In a twelfth aspect, the emission control information comprises a first emission control configuration parameter associated with a frequency range 1 operating configuration, and a second emission control configuration parameter associated with a frequency range 2 operating configuration.

In a thirteenth aspect, the emission control information comprises a first emission control configuration parameter associated with a first uplink waveform configuration, and a second emission control configuration parameter associated with a second uplink waveform configuration.

In a fourteenth aspect, process 700 includes selecting the first emission control configuration or the second emission control configuration based at least in part on at least one of a regulatory requirement associated with the network entity, or a current operating state associated with the network entity.

In a fifteenth aspect, the current operating state associated with the network entity comprises at least one of a number of UE associated with the network entity, or a current spectrum allocation configuration associated with the network entity.

In a sixteenth aspect, the emission control information indicates a maximum duty cycle, and a spurious power level limit associated with the maximum duty cycle, wherein the emission control information further indicates to increase the spurious power level limit based at least in part on a current duty cycle associated with the UE being lower than the maximum duty cycle.

In a seventeenth aspect, the emission control information indicates a spurious emission power level limit adjustment, and a duty cycle threshold associated with applying the spurious power level limit adjustment.

In an eighteenth aspect, the emission control information indicates a maximum duty cycle, a maximum spurious power level limit, and a scaling factor indicator associated with the maximum duty cycle and the maximum spurious power level limit.

In a nineteenth aspect, the emission control information indicates a linear scaling value, or a non-linear scaling function identifier.

In a twentieth aspect, the duty cycle is based at least in part on a time window and a maximum on time within the time window.

In a twenty-first aspect, the emission control information indicates a spurious power level limit that is based at least in part on an aerial subscription associated with the UE.

In a twenty-second aspect, the emission control information may be based at least in part on a current operating height associated with the UE, or a geofence.

In a twenty-third aspect, the emission control information indicates a spurious emission power level limit, a first spurious emission power level adjustment associated with a first frequency band, a second spurious emission power level adjustment associated with a second frequency band, and a duty cycle threshold, wherein the emission control information further indicates to utilize the first spurious emission power level adjustment or the second spurious emission power level adjustment based at least in part on a current duty cycle associated with the UE, and a frequency band associated with a UE transmission.

Although FIG. 7 shows example blocks of process 700, in some aspects, process 700 may include additional blocks, fewer blocks, different blocks, or differently arranged blocks than those depicted in FIG. 7. Additionally, or alternatively, two or more of the blocks of process 700 may be performed in parallel.

Figure 8:
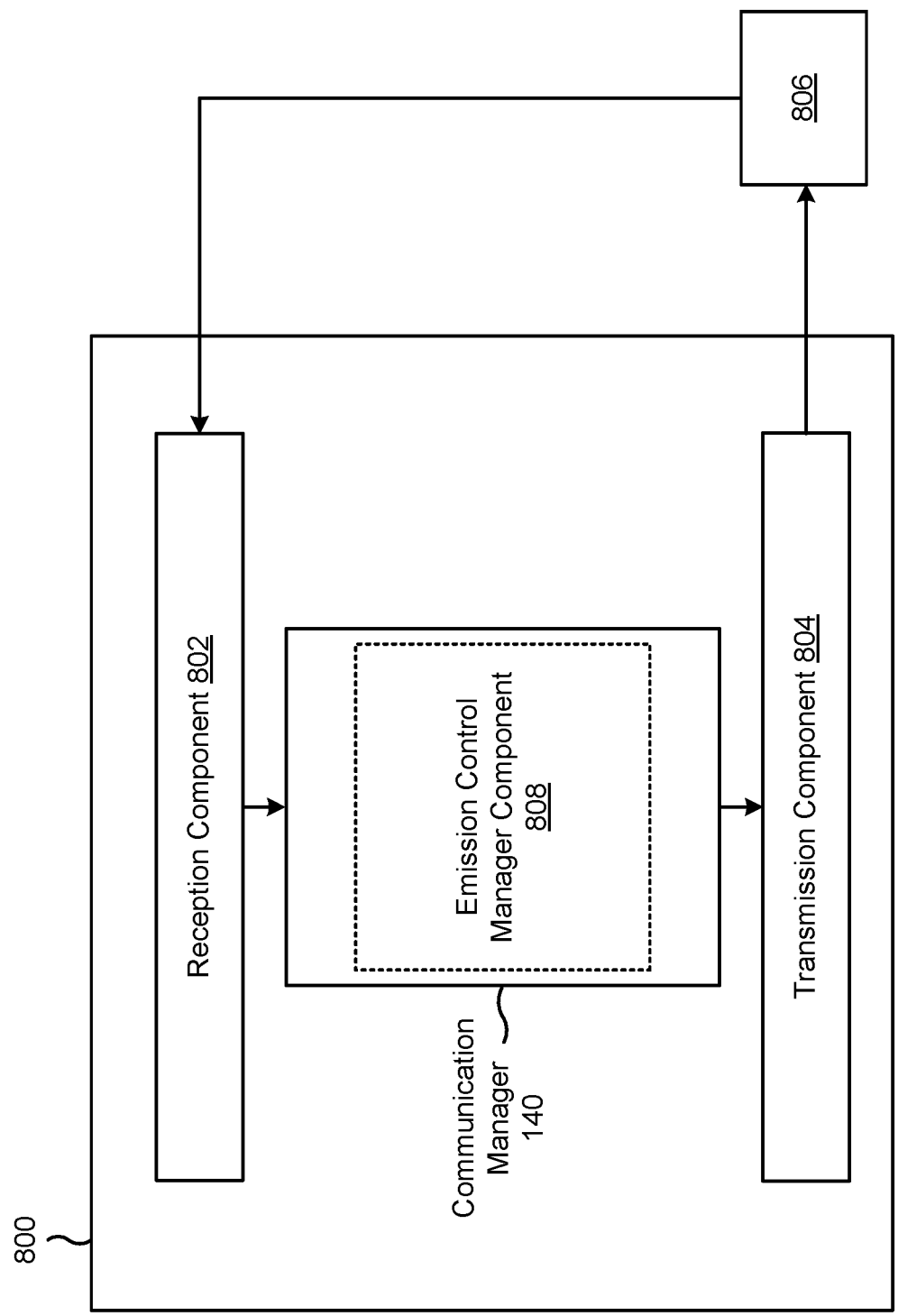
FIG. 8 is a diagram of an example apparatus for wireless communication, in accordance with the present disclosure.

FIG. 8 is a diagram of an example apparatus 800 for wireless communication, in accordance with the present disclosure. The apparatus 800 may be a UE, or a UE may include the apparatus 800. In some aspects, the apparatus 800 includes a reception component 802 and a transmission component 804, which may be in communication with one another (for example, via one or more buses and/or one or more other components). As shown, the apparatus 800 may communicate with another apparatus 806 (such as a UE, a base station, or another wireless communication device) using the reception component 802 and the transmission component 804. As further shown, the apparatus 800 may include the communication manager 140. The communication manager 140 may include one or more of an emission control manager component 808, among other examples.

In some aspects, the apparatus 800 may be configured to perform one or more operations described herein in connection with FIGS. 3-7. Additionally, or alternatively, the apparatus 800 may be configured to perform one or more processes described herein, such as process 600 of FIG. 6, or a combination thereof. In some aspects, the apparatus 800 and/or one or more components shown in FIG. 8 may include one or more components of the UE described in connection with FIG. 2. Additionally, or alternatively, one or more components shown in FIG. 8 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 802 may receive communications, such as reference signals, control information, data communications, or a combination thereof, from the apparatus 806. The reception component 802 may provide received communications to one or more other components of the apparatus 800. In some aspects, the reception component 802 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 800. In some aspects, the reception component 802 may include one or more antennas, a modem, a demodulator, a MIMO detector, a receive processor, a controller/processor, a memory, or a combination thereof, of the UE described in connection with FIG. 2.

The transmission component 804 may transmit communications, such as reference signals, control information, data communications, or a combination thereof, to the apparatus 806. In some aspects, one or more other components of the apparatus 800 may generate communications and may provide the generated communications to the transmission component 804 for transmission to the apparatus 806. In some aspects, the transmission component 804 may perform signal processing on the generated communications (such as filtering, amplification, modulation, digital-to-analog conversion, multiplexing, interleaving, mapping, or encoding, among other examples), and may transmit the processed signals to the apparatus 806. In some aspects, the transmission component 804 may include one or more antennas, a modem, a modulator, a transmit MIMO processor, a transmit processor, a controller/processor, a memory, or a combination thereof, of the UE described in connection with FIG. 2. In some aspects, the transmission component 804 may be co-located with the reception component 802 in a transceiver.

The emission control manager component 808 may obtain emission control information that indicates a first emission control configuration associated with a first operating configuration and a second emission control configuration associated with a second operating configuration. The transmission component 804 may transmit, using the first emission control configuration or the second emission control configuration based at least in part on a UE operating configuration associated with the UE, a communication.

The transmission component 804 may transmit UE capability information.

The number and arrangement of components shown in FIG. 8 are provided as an example. In practice, there may be additional components, fewer components, different components, or differently arranged components than those shown in FIG. 8. Furthermore, two or more components shown in FIG. 8 may be implemented within a single component, or a single component shown in FIG. 8 may be implemented as multiple, distributed components. Additionally, or alternatively, a set of (one or more) components shown in FIG. 8 may perform one or more functions described as being performed by another set of components shown in FIG. 8.

Figure 9:
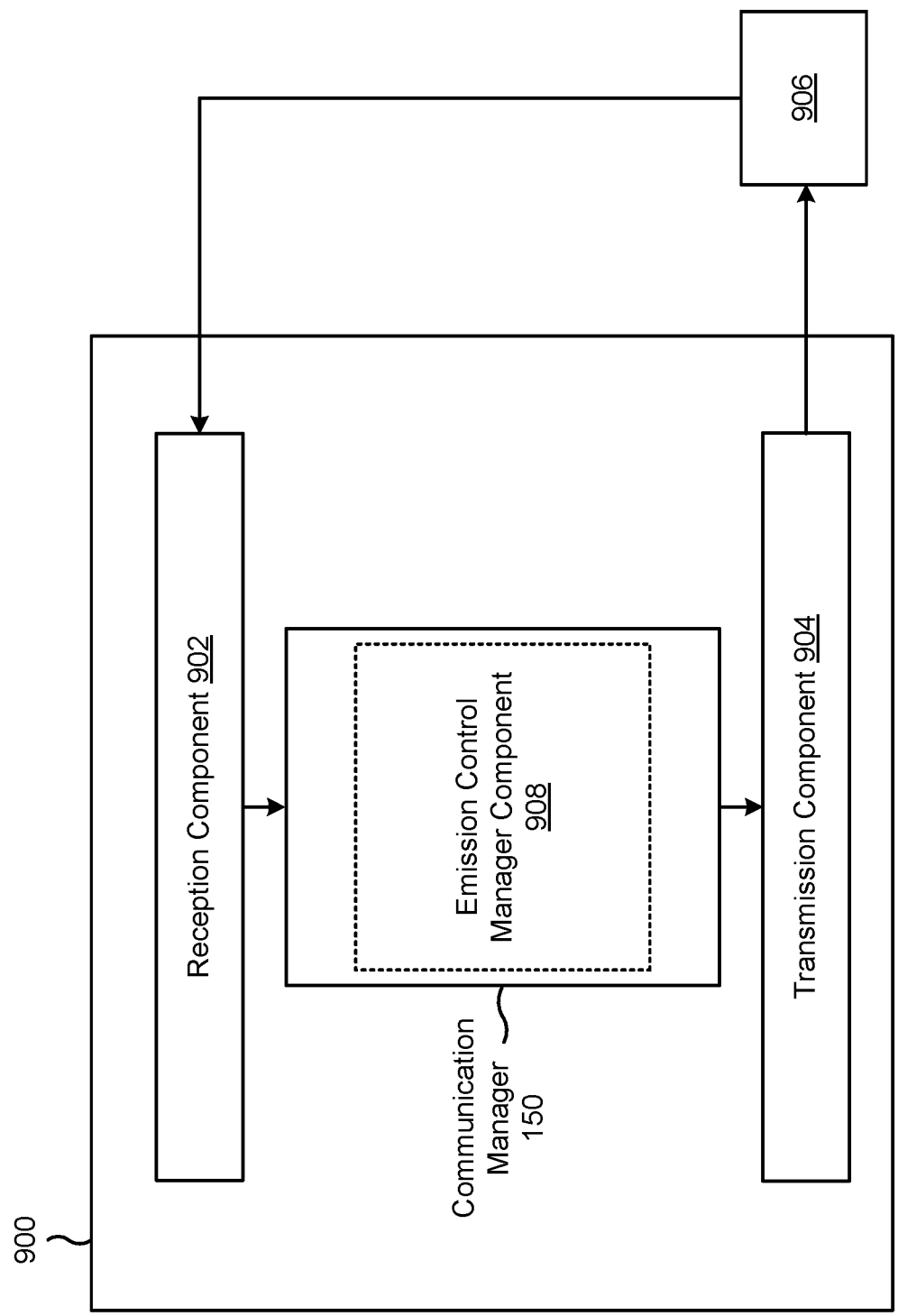
FIG. 9 is a diagram of an example apparatus for wireless communication, in accordance with the present disclosure.

FIG. 9 is a diagram of an example apparatus 900 for wireless communication. The apparatus 900 may be a network entity, or a network entity may include the apparatus 900. In some aspects, the apparatus 900 includes a reception component 902 and a transmission component 904, which may be in communication with one another (for example, via one or more buses and/or one or more other components). As shown, the apparatus 900 may communicate with another apparatus 906 (such as a UE, a base station, or another wireless communication device) using the reception component 902 and the transmission component 904. As further shown, the apparatus 900 may include the communication manager 150. The communication manager 150 may include one or more of an emission control manager component 908, among other examples.

In some aspects, the apparatus 900 may be configured to perform one or more operations described herein in connection with FIGS. 3-7. Additionally, or alternatively, the apparatus 900 may be configured to perform one or more processes described herein, such as process 700 of FIG. 7, or a combination thereof. In some aspects, the apparatus 900 and/or one or more components shown in FIG. 9 may include one or more components of the network entity described in connection with FIG. 2. Additionally, or alternatively, one or more components shown in FIG. 9 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 902 may receive communications, such as reference signals, control information, data communications, or a combination thereof, from the apparatus 906. The reception component 902 may provide received communications to one or more other components of the apparatus 900. In some aspects, the reception component 902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 900. In some aspects, the reception component 902 may include one or more antennas, a modem, a demodulator, a MIMO detector, a receive processor, a controller/processor, a memory, or a combination thereof, of the network entity described in connection with FIG. 2.

The transmission component 904 may transmit communications, such as reference signals, control information, data communications, or a combination thereof, to the apparatus 906. In some aspects, one or more other components of the apparatus 900 may generate communications and may provide the generated communications to the transmission component 904 for transmission to the apparatus 906. In some aspects, the transmission component 904 may perform signal processing on the generated communications (such as filtering, amplification, modulation, digital-to-analog conversion, multiplexing, interleaving, mapping, or encoding, among other examples), and may transmit the processed signals to the apparatus 906. In some aspects, the transmission component 904 may include one or more antennas, a modem, a modulator, a transmit MIMO processor, a transmit processor, a controller/processor, a memory, or a combination thereof, of the network entity described in connection with FIG. 2. In some aspects, the transmission component 904 may be co-located with the reception component 902 in a transceiver.

The reception component 902 may receive UE capability information associated with an aerial UE. The transmission component 904 may transmit emission control information that indicates a first emission control configuration associated with a first operating configuration and a second emission control configuration associated with a second operating configuration, the emission control information being based at least in part on the UE capability information.

The emission control manager component 908 may select the first emission control configuration or the second emission control configuration based at least in part on at least one of a regulatory requirement associated with the network entity, or a current operating state associated with the network entity.

The number and arrangement of components shown in FIG. 9 are provided as an example. In practice, there may be additional components, fewer components, different components, or differently arranged components than those shown in FIG. 9. Furthermore, two or more components shown in FIG. 9 may be implemented within a single component, or a single component shown in FIG. 9 may be implemented as multiple, distributed components. Additionally, or alternatively, a set of (one or more) components shown in FIG. 9 may perform one or more functions described as being performed by another set of components shown in FIG. 9.

The following provides an overview of some Aspects of the present disclosure:

Aspect 1: A method of wireless communication performed by a user equipment (UE), comprising: obtaining emission control information that indicates a first emission control configuration associated with a first operating configuration and a second emission control configuration associated with a second operating configuration; and transmitting, using the first emission control configuration or the second emission control configuration based at least in part on a UE operating configuration associated with the UE, a communication.

Aspect 2: The method of Aspect 1, wherein obtaining the emission control information further comprises: receiving the emission control information based at least in part on at least one of: a unicast radio resource control message, a system information block, network signaling, a medium access control (MAC) control element (CE), or downlink control information.

Aspect 3: The method of Aspect 1, wherein obtaining the emission control information further comprises: obtaining the emission control information based at least in part on pre-configured emission control information.

Aspect 4: The method of any one of Aspects 1-3, wherein the first operating configuration comprises a command and control (C2) mode 1 communication and the second operating configuration comprises a C2 mode 2 communication, wherein the first emission control configuration indicates a first out-of-band (OOB) power level limit and the second emission control configuration indicates a second OOB power level limit, and wherein the first OOB power level limit is greater than the second OOB power level limit.

Aspect 5: The method of Aspect 4, wherein the C2 mode 1 communication is associated with a first data rate and a first duty cycle, wherein the C2 mode 2 communication is associated with a second data rate and a second duty cycle, wherein the first data rate is lower than the second data rate, and wherein the first duty cycle is longer than the second duty cycle.

Aspect 6: The method of any one of Aspects 1-5, wherein the first operating configuration comprises a command and control (C2) mode 1 communication and the second operating configuration comprises a C2 mode 2 communication, and wherein the first emission control configuration indicates a first frequency band adjacent to a terrestrial communication frequency band and the second emission control configuration indicates a second frequency band non-adjacent to the terrestrial communication frequency band.

Aspect 7: The method of Aspect 6, wherein the first emission control configuration indicates a first out-of-band (OOB) power spectral density limit, and the second emission control configuration indicates a second OOB power spectral density limit, and wherein the first OOB power spectral density limit is lower than the second OOB power spectral density limit.

Aspect 8: The method of Aspect 6, wherein the first operating configuration comprises a first duty cycle, and the second operating configuration comprises a second duty cycle, and wherein the first duty cycle is longer than the second duty cycle.

Aspect 9: The method of any one of Aspects 1-8, wherein the first operating configuration comprises a command and control (C2) mode 1 communication and communicating based at least in part on shared spectrum, wherein the second operating configuration includes a C2 mode 2 communication and communicating based at least in part on shared spectrum, wherein the first emission control configuration indicates a first in-band power spectral density (PSD) limit and the second emission control configuration indicates a second in-band PSD limit, and wherein the first in-band PSD limit is higher than the second in-band PSD limit.

Aspect 10: The method of any one of Aspects 1-9, wherein the first operating configuration comprises a command and control (C2) mode 1 communication and communicating based at least in part on a partitioned spectrum, wherein the second operating configuration comprises a C2 mode 2 communication and communicating based at least in part on the partitioned spectrum, wherein the first emission control configuration indicates a first in-band power spectral density (PSD) limit and the second emission control configuration indicates a second in-band PSD limit, and wherein the first in-band PSD limit is a same value as the second in-band PSD limit.

Aspect 11: The method of Aspect 10, wherein the partitioned spectrum comprises at least one of: frequency division multiplexing, time division multiplexing, or spatial division multiplexing.

Aspect 12: The method of any one of Aspects 1-11, further comprising: transmitting UE capability information, and wherein obtaining the emission control information further comprises: receiving the emission control information based at least in part on transmitting the UE capability information. wherein obtaining the emission control information further comprises: receiving the emission control information based at least in part on transmitting the UE capability information.

Aspect 13: The method of Aspect 12, wherein the UE capability information comprises at least one of: aerial subscription information associated with the UE, or video capability information associated with the UE.

Aspect 14: The method of any one of Aspects 1-13, wherein the emission control information comprises: a first emission control configuration parameter associated with a frequency division multiplex operating configuration, and a second emission control configuration parameter associated with a time division multiplex operating configuration.

Aspect 15: The method of any one of Aspects 1-14, wherein the emission control information comprises: a first emission control configuration parameter associated with a frequency range 1 operating configuration, and a second emission control configuration parameter associated with a frequency range 2 operating configuration.

Aspect 16: The method of any one of Aspects 1-15, wherein the emission control information comprises: a first emission control configuration parameter associated with a first uplink waveform configuration, and a second emission control configuration parameter associated with a second uplink waveform configuration.

Aspect 17: The method of any one of Aspects 1-16, wherein the emission control information indicates: a maximum duty cycle, and a spurious power level limit associated with the maximum duty cycle, wherein the emission control information further indicates to increase the spurious power level limit based at least in part on a current duty cycle associated with the UE being lower than the maximum duty cycle.

Aspect 18: The method of any one of Aspects 1-17, wherein the emission control information indicates: a spurious emission power level limit adjustment, and a duty cycle threshold associated with applying the spurious power level limit adjustment.

Aspect 19: The method of any one of Aspects 1-18, wherein the emission control information indicates a spurious power level limit associated with a dynamic value, wherein the dynamic value is based at least in part on: a maximum duty cycle, a maximum spurious power level limit, and a scaling factor indicator associated with the maximum duty cycle and the maximum spurious power level limit.

Aspect 20: The method of Aspect 19, wherein the scaling factor indicator comprises: a linear scaling value, or a non-linear scaling function identifier.

Aspect 21: The method of any one of Aspects 1-20, wherein the emission control information indicates a first emission control parameter associated with a duty cycle, and wherein the duty cycle is based at least in part on a time window and a maximum on time within the time window.

Aspect 22: The method of any one of Aspects 1-21, wherein the emission control information indicates a spurious power level limit that is based at least in part on an aerial subscription associated with the UE.

Aspect 23: The method of any one of Aspects 1-22, wherein the emission control information indicates a duty cycle limit associated with a dynamic value, wherein the dynamic value is based at least in part on one of: a current operating height associated with the UE, or a geofence.

Aspect 24: The method of any one of Aspects 1-23, wherein the emission control information indicates: a spurious emission power level limit, a first spurious emission power level adjustment associated with a first frequency band, a second spurious emission power level adjustment associated with a second frequency band, and a duty cycle threshold, wherein the emission control information further indicates to utilize the first spurious emission power level adjustment or the second spurious emission power level adjustment based at least in part on: a current duty cycle associated with the UE, and a frequency band associated with a UE transmission.

Aspect 25: A method of wireless communication performed by a network entity, comprising: receiving user equipment (UE) capability information associated with an aerial UE; and transmitting emission control information that indicates a first emission control configuration associated with a first operating configuration and a second emission control configuration associated with a second operating configuration, the emission control information being based at least in part on the UE capability information.

Aspect 26: The method of Aspect 25, wherein transmitting the emission control information further comprises: transmitting the emission control information based at least in part on at least one of: a unicast radio resource control message, a system information block, network signaling, a medium access control (MAC) control element (CE), or downlink control information.

Aspect 27: The method of Aspect 25 or Aspect 26, wherein the first operating configuration comprises a command and control (C2) mode 1 communication and the second operating configuration comprises a C2 mode 2 communication, wherein the first emission control configuration indicates a first out-of-band (OOB) power level limit and the second emission control configuration indicates a second OOB power level limit, and wherein the first OOB power level limit is greater than the second OOB power level limit.

Aspect 28: The method of Aspect 27, wherein the C2 mode 1 communication is associated with a first data rate and a first duty cycle, wherein the C2 mode 2 communication is associated with a second data rate and a second duty cycle, wherein the first data rate is lower than the second data rate, and wherein the first duty cycle is longer than the second duty cycle.

Aspect 29: The method of any one of Aspects 25-28, wherein the first operating configuration comprises a command and control (C2) mode 1 communication and the second operating configuration comprises a C2 mode 2 communication, and wherein the first emission control configuration indicates a first frequency band adjacent to a terrestrial communication frequency band and the second emission control configuration indicates a second frequency band non-adjacent to the terrestrial communication frequency band.

Aspect 30: The method of Aspect 29, wherein the first emission control configuration indicates a first out-of-band (OOB) power spectral density limit, and the second emission control configuration indicates a second OOB power spectral density limit, and wherein the first OOB power spectral density limit is lower than the second OOB power spectral density limit.

Aspect 31: The method of Aspect 29, wherein the first operating configuration comprises a first duty cycle, and the second operating configuration comprises a second duty cycle, and wherein the first duty cycle is longer than the second duty cycle.

Aspect 32: The method of any one of Aspects 25-31, wherein the first operating configuration comprises a command and control (C2) mode 1 communication and communicating based at least in part on shared spectrum, wherein the second operating configuration comprises a C2 mode 2 communication and communicating based at least in part on the shared spectrum, wherein the first emission control configuration indicates a first in-band power spectral density (PSD) limit and the second emission control configuration indicates a second in-band PSD limit, and wherein the first in-band PSD limit is higher than the second in-band PSD limit.

Aspect 33: The method of any one of Aspects 25-32, wherein the first operating configuration comprises a command and control (C2) mode 1 communication and communicating based at least in part on a partitioned spectrum, wherein the second operating configuration comprises a C2 mode 2 communication and communicating based at least in part on the partitioned spectrum, wherein the first emission control configuration indicates a first in-band power spectral density (PSD) limit and the second emission control configuration indicates a second in-band PSD limit, and wherein the first in-band PSD limit is a same value as the second in-band PSD limit.

Aspect 34: The method of Aspect 33, wherein the partitioned spectrum comprises at least one of: frequency division multiplexing, time division multiplexing, or spatial division multiplexing.

Aspect 35: The method of any one of Aspects 25-34, wherein the UE capability information comprises at least one of: aerial subscription information associated with the UE, or video capability information associated with the UE.

Aspect 36: The method of any one of Aspects 25-35, wherein the emission control information comprises: a first emission control configuration parameter associated with a frequency division multiplex operating configuration, and a second emission control configuration parameter associated with a time division multiplex operating configuration.

Aspect 37: The method of any one of Aspects 25-36, wherein the emission control information comprises: a first emission control configuration parameter associated with a frequency range 1 operating configuration, and a second emission control configuration parameter associated with a frequency range 2 operating configuration.

Aspect 38: The method of any one of Aspects 25-37, wherein the emission control information comprises: a first emission control configuration parameter associated with a first uplink waveform configuration, and a second emission control configuration parameter associated with a second uplink waveform configuration.

Aspect 39: The method of any one of Aspects 25-38, further comprising: selecting the first emission control configuration or the second emission control configuration based at least in part on at least one of: a regulatory requirement associated with the network entity, or a current operating state associated with the network entity.

Aspect 40: The method of Aspect 39, wherein the current operating state associated with the network entity comprises at least one of: a number of UE associated with the network entity, or a current spectrum allocation configuration associated with the network entity.

Aspect 41: The method of any one of Aspects 25-40, wherein the emission control information indicates: a maximum duty cycle, and a spurious power level limit associated with the maximum duty cycle, wherein the emission control information further indicates to increase the spurious power level limit based at least in part on a current duty cycle associated with the UE being lower than the maximum duty cycle.

Aspect 42: The method of any one of Aspects 25-41, wherein the emission control information indicates: a spurious emission power level limit adjustment, and a duty cycle threshold associated with applying the spurious power level limit adjustment.

Aspect 43: The method of any one of Aspects 25-42, wherein the emission control information indicates a spurious power level limit associated with a dynamic value, wherein the dynamic value is based at least in part on: a maximum duty cycle, a maximum spurious power level limit, and a scaling factor indicator associated with the maximum duty cycle and the maximum spurious power level limit.

Aspect 44: The method of Aspect 43, wherein the scaling factor indicator comprises: a linear scaling value, or a non-linear scaling function identifier.

Aspect 45: The method of any one of Aspects 25-44, wherein the emission control information indicates a first emission control parameter associated with a duty cycle, and wherein the duty cycle is based at least in part on a time window and a maximum on time within the time window.

Aspect 46: The method of any one of Aspects 25-45, wherein the emission control information indicates a spurious power level limit that is based at least in part on an aerial subscription associated with the UE.

Aspect 47: The method of any one of Aspects 25-46, wherein the emission control information indicates a duty cycle limit associated with a dynamic value, wherein the dynamic value is based at least in part on one of: a current operating height associated with the UE, or a geofence.

Aspect 48: The method of any one of Aspects 25-47, wherein the emission control information indicates: a spurious emission power level limit, a first spurious emission power level adjustment associated with a first frequency band, a second spurious emission power level adjustment associated with a second frequency band, and a duty cycle threshold, wherein the emission control information further indicates to utilize the first spurious emission power level adjustment or the second spurious emission power level adjustment based at least in part on: a current duty cycle associated with the UE, and a frequency band associated with a UE transmission.

Aspect 49: An apparatus for wireless communication at a device, comprising a processor; memory coupled with the processor; and instructions stored in the memory and executable by the processor to cause the apparatus to perform the method of one or more of Aspects 1-24.

Aspect 50: A device for wireless communication, comprising a memory and one or more processors coupled to the memory, the one or more processors configured to perform the method of one or more of Aspects 1-24.

Aspect 51: An apparatus for wireless communication, comprising at least one means for performing the method of one or more of Aspects 1-24.

Aspect 52: A non-transitory computer-readable medium storing code for wireless communication, the code comprising instructions executable by a processor to perform the method of one or more of Aspects 1-24.

Aspect 53: A non-transitory computer-readable medium storing a set of instructions for wireless communication, the set of instructions comprising one or more instructions that, when executed by one or more processors of a device, cause the device to perform the method of one or more of Aspects 1-24.

Aspect 54: An apparatus for wireless communication at a device, comprising a processor; memory coupled with the processor; and instructions stored in the memory and executable by the processor to cause the apparatus to perform the method of one or more of Aspects 25-48.

Aspect 55: A device for wireless communication, comprising a memory and one or more processors coupled to the memory, the one or more processors configured to perform the method of one or more of Aspects 25-48.

Aspect 56: An apparatus for wireless communication, comprising at least one means for performing the method of one or more of Aspects 25-48.

Aspect 57: A non-transitory computer-readable medium storing code for wireless communication, the code comprising instructions executable by a processor to perform the method of one or more of Aspects 25-48.

Aspect 58: A non-transitory computer-readable medium storing a set of instructions for wireless communication, the set of instructions comprising one or more instructions that, when executed by one or more processors of a device, cause the device to perform the method of one or more of Aspects 25-48.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware and/or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, and/or functions, among other examples, whether referred to as software, firmware, middleware, microcode, hardware description language, or otherwise. As used herein, a "processor" is implemented in hardware and/or a combination of hardware and software. It will be apparent that systems and/or methods described herein may be implemented in different forms of hardware and/or a combination of hardware and software. The actual specialized control hardware or software code used to implement these systems and/or methods is not limiting of the aspects. Thus, the operation and behavior of the systems and/or methods are described herein without reference to specific software code, since those skilled in the art will understand that software and hardware can be designed to implement the systems and/or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, not equal to the threshold, or the like.

Even though particular combinations of features are recited in the claims and/or disclosed in the specification, these combinations are not intended to limit the disclosure of various aspects. Many of these features may be combined in ways not specifically recited in the claims and/or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," or the like are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. An apparatus for wireless communication at a user equipment (UE), comprising:
    a memory; and
    one or more processors, coupled to the memory, configured to:
    obtain emission control information that indicates a first emission control configuration associated with a first operating configuration and a second emission control configuration associated with a second operating configuration, wherein the first operating configuration comprises a command and control (C2) mode 1 communication for the UE to communicate based at least in part on a shared spectrum and wherein the second operating configuration includes a C2 mode 2 communication for the UE to communicate based at least in part on the shared spectrum; and
    transmit, using the first emission control configuration or the second emission control configuration based at least in part on a UE operating configuration associated with the UE, a communication, wherein the first emission control configuration indicates a first in-band power spectral density (PSD) limit and the second emission control configuration indicates a second in-band PSD limit, and wherein the first in-band PSD limit is higher than the second in-band PSD limit.

2. The apparatus of claim 1, wherein the one or more processors, to obtain the emission control information, are configured to:
    receive the emission control information based at least in part on at least one of:
    a unicast radio resource control message,
    a system information block,
    network signaling,
    a medium access control (MAC) control element (CE), or
    downlink control information.

3. The apparatus of claim 1, wherein the first operating configuration comprises a command and control (C2) mode 1 communication and the second operating configuration comprises a C2 mode 2 communication, wherein the first emission control configuration indicates a first out-of-band (OOB) power level limit and the second emission control configuration indicates a second OOB power level limit, and
wherein the first OOB power level limit is greater than the second OOB power level limit.

4. The apparatus of claim 1, wherein the first operating configuration comprises a command and control (C2) mode 1 communication and the second operating configuration comprises a C2 mode 2 communication, and
wherein the first emission control configuration indicates a first frequency band adjacent to a terrestrial communication frequency band and the second emission control configuration indicates a second frequency band non-adjacent to the terrestrial communication frequency band.

5. The apparatus of claim 4, wherein the first emission control configuration indicates a first out-of-band (OOB) power spectral density limit, and the second emission control configuration indicates a second OOB power spectral density limit, and
wherein the first OOB power spectral density limit is lower than the second OOB power spectral density limit.

6. The apparatus of claim 1, wherein the first operating configuration comprises a command and control (C2) mode 1 communication and communicating based at least in part on a partitioned spectrum,
wherein the second operating configuration comprises a C2 mode 2 communication and communicating based at least in part on the partitioned spectrum,
wherein the first emission control configuration indicates a first in-band power spectral density (PSD) limit and the second emission control configuration indicates a second in-band PSD limit, and
wherein the first in-band PSD limit is a same value as the second in-band PSD limit.

7. The apparatus of claim 1, wherein the one or more processors are further configured to:
transmit UE capability information, and
wherein the one or more processors, to obtain the emission control information, are configured to:
receive the emission control information based at least in part on transmitting the UE capability information.

8. The apparatus of claim 1, wherein the emission control information comprises:
a first emission control configuration parameter associated with a frequency division multiplex operating configuration, and
a second emission control configuration parameter associated with a time division multiplex operating configuration.

9. The apparatus of claim 1, wherein the emission control information comprises:
a first emission control configuration parameter associated with a frequency range 1 operating configuration, and
a second emission control configuration parameter associated with a frequency range 2 operating configuration.

10. The apparatus of claim 1, wherein the emission control information comprises:
a first emission control configuration parameter associated with a first uplink waveform configuration, and
a second emission control configuration parameter associated with a second uplink waveform configuration.

11. The apparatus of claim 1, wherein the emission control information indicates:
a maximum duty cycle, and
a spurious power level limit associated with the maximum duty cycle,
wherein the emission control information further indicates to increase the spurious power level limit based at least in part on a current duty cycle associated with the UE being lower than the maximum duty cycle.

12. The apparatus of claim 1, wherein the emission control information indicates:
a spurious emission power level limit adjustment, and
a duty cycle threshold associated with applying the spurious emission power level limit adjustment.

13. The apparatus of claim 1, wherein the emission control information indicates a spurious power level limit associated with a dynamic value, wherein the dynamic value is based at least in part on:
a maximum duty cycle,
a maximum spurious power level limit, and
a scaling factor indicator associated with the maximum duty cycle and the maximum spurious power level limit.

14. The apparatus of claim 1, wherein the emission control information indicates a duty cycle limit associated with a dynamic value, wherein the dynamic value is based at least in part on one of:
a current operating height associated with the UE, or
a geofence.

15. The apparatus of claim 1, wherein the emission control information indicates:
a spurious emission power level limit,
a first spurious emission power level adjustment associated with a first frequency band,
a second spurious emission power level adjustment associated with a second frequency band, and
a duty cycle threshold,
wherein the emission control information further indicates to utilize the first spurious emission power level adjustment or the second spurious emission power level adjustment based at least in part on:
a current duty cycle associated with the UE, and
a frequency band associated with a UE transmission.

16. An apparatus for wireless communication at a network entity, comprising:
a memory; and
one or more processors, coupled to the memory, configured to:
receive user equipment (UE) capability information (UE capability information) associated with an aerial UE; and
transmit emission control information that indicates a first emission control configuration associated with a first operating configuration and a second emission control configuration associated with a second operating configuration, the emission control information being based at least in part on the UE capability information, wherein the first operating configuration comprises a first data rate and a first duty cycle for the aerial UE to communicate based at least in part on shared spectrum, wherein the second operating configuration comprises a second data rate and a second duty cycle for the aerial UE to communicate based at least in part on the shared spectrum, wherein the first emission control configuration indicates a first in-band power spectral density (PSD) limit and the second emission control configuration indicates a second in-band PSD limit, and wherein the first in-band PSD limit is higher than the second in-band PSD limit.

17. The apparatus of claim 16, wherein the first operating configuration comprises a first data rate and a first duty cycle,
wherein the second operating configuration comprises a second data rate and a second duty cycle,
wherein the first emission control configuration indicates a first out-of-band (OOB) power level limit and the second emission control configuration indicates a second OOB power level limit, and
wherein the first OOB power level limit is greater than the second OOB power level limit.

18. The apparatus of claim 16, wherein the first operating configuration comprises a first data rate and a first duty cycle,
wherein the second operating configuration comprises a second data rate and a second duty cycle,
wherein the first emission control configuration indicates a first frequency band adjacent to a terrestrial communication frequency band and first out-of-band (OOB) power spectral density limit,
wherein the second emission control configuration indicates a second frequency band non-adjacent to the terrestrial communication frequency band and a second OOB power spectral density limit, and
wherein the first OOB power spectral density limit is lower than the second OOB power spectral density limit.

19. The apparatus of claim 16, wherein the one or more processors are further configured to:
select the first emission control configuration or the second emission control configuration based at least in part on at least one of:
a regulatory requirement associated with the network entity, or
a current operating state associated with the network entity.

20. The apparatus of claim 16, wherein the emission control information indicates:
a maximum duty cycle, and
a spurious power level limit associated with the maximum duty cycle,
wherein the emission control information further indicates to increase the spurious power level limit based at least in part on a current duty cycle associated with the UE being lower than the maximum duty cycle.

21. The apparatus of claim 16, wherein the emission control information indicates a spurious power level limit associated with a dynamic value, wherein the dynamic value is based at least in part on:
a maximum duty cycle,
a maximum spurious power level limit, and
a scaling factor indicator associated with the maximum duty cycle and the maximum spurious power level limit.

22. The apparatus of claim 16, wherein the emission control information indicates:
a spurious emission power level limit,
a first spurious emission power level adjustment associated with a first frequency band,
a second spurious emission power level adjustment associated with a second frequency band, and
a duty cycle threshold,
wherein the emission control information further indicates to utilize the first spurious emission power level adjustment or the second spurious emission power level adjustment based at least in part on:
a current duty cycle associated with the UE, and
a frequency band associated with a UE transmission.

23. A method of wireless communication performed by a user equipment (UE), comprising:
obtaining emission control information that indicates a first emission control configuration associated with a first operating configuration and a second emission control configuration associated with a second operating configuration, wherein the first operating configuration comprises a command and control (C2) mode 1 communication for the UE to communicate based at least in part on a shared spectrum and wherein the second operating configuration includes a C2 mode 2 communication for the UE to communicate based at least in part on the shared spectrum; and
transmitting, using the first emission control configuration or the second emission control configuration based at least in part on a UE operating configuration associated with the UE, a communication, wherein the first emission control configuration indicates a first in-band power spectral density (PSD) limit and the second emission control configuration indicates a second in-band PSD limit, and wherein the first in-band PSD limit is higher than the second in-band PSD limit.

24. The method of claim 23, wherein the emission control information indicates:
a spurious emission power level limit,
a first spurious emission power level adjustment associated with a first frequency band,
a second spurious emission power level adjustment associated with a second frequency band, and
a duty cycle threshold,
wherein the emission control information further indicates to utilize the first spurious emission power level adjustment or the second spurious emission power level adjustment based at least in part on:
a current duty cycle associated with the UE, and
a frequency band associated with a UE transmission.

25. A method of wireless communication performed by a network entity, comprising:
receiving user equipment (UE) capability information (UE capability information) associated with an aerial UE; and
transmitting emission control information that indicates a first emission control configuration associated with a first operating configuration and a second emission control configuration associated with a second operating configuration, the emission control information being based at least in part on the UE capability information, wherein the first operating configuration comprises a first data rate and a first duty cycle for the aerial UE to communicate based at least in part on a shared spectrum, wherein the second operating configuration comprises a second data rate and a second duty cycle for the aerial UE to communicate based at least in part on the shared spectrum, wherein the first emission control configuration indicates a first in-band power spectral density (PSD) limit and the second emission control configuration indicates a second in-band PSD limit, and the first in-band PSD limit is higher than the second in-band PSD limit.

26. The method of claim 25 wherein the first operating configuration comprises a command and control (C2) mode 1 communication and the second operating configuration comprises a C2 mode 2 communication, and wherein the first emission control configuration indicates a first frequency band adjacent to a terrestrial communication frequency band and the second emission control configuration indicates a second frequency band non-adjacent to the terrestrial communication frequency band.

27. The method of claim 25, wherein the emission control information indicates:
a spurious emission power level limit adjustment, and
a duty cycle threshold associated with applying the spurious emission power level limit adjustment.

* * * * *